US010936139B2

(12) United States Patent
Wang et al.

(10) Patent No.: US 10,936,139 B2
(45) Date of Patent: Mar. 2, 2021

(54) TOUCH PANEL AND TOUCH DISPLAY DEVICE ALLOWING RELATIVELY UNIFORM DISTRIBUTION OF CONTACT VIAS ACROSS TOUCH ELECTRODE BLOCKS

(71) Applicants: Ordos Yuansheng Optoelectronics Co., Ltd., Inner Mongolia (CN); BOE Technology Group Co., Ltd., Beijing (CN)

(72) Inventors: Zhen Wang, Beijing (CN); Xiaozhou Zhan, Beijing (CN); Lele Cong, Beijing (CN); Yun Qiao, Beijing (CN); Jian Sun, Beijing (CN); Han Zhang, Beijing (CN); Wenwen Qin, Beijing (CN); Zhengkui Wang, Beijing (CN)

(73) Assignees: Ordos Yuansheng Optoelectronics Co., Ltd., Inner Mongolia (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/435,082

(22) Filed: Jun. 7, 2019

(65) Prior Publication Data

US 2020/0064955 A1 Feb. 27, 2020

(30) Foreign Application Priority Data

Aug. 24, 2018 (CN) .......................... 201810975666.7

(51) Int. Cl.
*G06F 3/047* (2006.01)
*G06F 3/041* (2006.01)

(52) U.S. Cl.
CPC .......... *G06F 3/047* (2013.01); *G06F 3/04164* (2019.05)

(58) Field of Classification Search
CPC . G06F 3/0416; G06F 3/04164–041662; G06F 3/044; G06F 3/0443; G06F 3/0448; G06F 3/047; G06F 2203/04103
See application file for complete search history.

(56) References Cited

U.S. PATENT DOCUMENTS

2018/0067599 A1* 3/2018 Cai .......................... G06F 3/044
2018/0329544 A1* 11/2018 Yeh .......................... G06F 3/044
(Continued)

FOREIGN PATENT DOCUMENTS

| CN | 107153492 A | 9/2017 |
| CN | 107272966 A | 10/2017 |
| CN | 108228004 A | 6/2018 |

OTHER PUBLICATIONS

"First Office Action and English language translation", CN Application No. 201810975666.7, dated Nov. 26, 2020, 14 pp.

*Primary Examiner* — Nathan Danielsen
(74) *Attorney, Agent, or Firm* — Myers Bigel, P.A.

(57) ABSTRACT

A touch panel including a substrate, an insulating layer, touch electrode blocks, and electrode lines. The touch electrode blocks include an array of first type touch electrode blocks having a regular shape and a second type touch electrode block having an irregular shape. Ones of the first type touch electrode blocks are electrically connected to respective ones of the electrode lines by respective X first contact vias extending through the insulating layer, and the respective X first contact vias are arranged along a straight line in a column direction. The second type touch electrode block is electrically connected to a first corresponding one of the electrode lines by Y second contact vias extending through the insulating layer, and the Y second contact vias are arranged along at least one straight line in the column direction. X and Y are natural numbers, and $0.75 \times X \le Y \le 1.25 \times X$.

17 Claims, 19 Drawing Sheets

(56) References Cited

U.S. PATENT DOCUMENTS

| | | | |
|---|---|---|---|
| 2019/0004626 A1* | 1/2019 | Ko | G06F 3/044 |
| 2019/0042038 A1* | 2/2019 | Lee | G06F 3/044 |
| 2019/0146621 A1* | 5/2019 | Aoki | G06F 3/044 |
| | | | 345/174 |
| 2019/0294282 A1 | 9/2019 | Dun et al. | |

* cited by examiner

TOUCH PANEL AND TOUCH DISPLAY DEVICE ALLOWING RELATIVELY UNIFORM DISTRIBUTION OF CONTACT VIAS ACROSS TOUCH ELECTRODE BLOCKS

CROSS-REFERENCE TO RELATED APPLICATIONS

The present application claims priority to Chinese Patent Application No. 201810975666.7 filed on Aug. 24, 2018, the entire disclosure of which is incorporated herein by reference.

TECHNICAL FIELD

The present disclosure relates to the field of touch technologies, and in particular, to a touch panel and a touch display device.

BACKGROUND

There has been advent of touch panels in the industry that have irregular rectangular touch areas, known as irregularly shaped touch panels. In these touch panels, the corners or edges of their touch areas tend to be shaped, for example, as rounded corners or notches, such that touch electrode blocks located at such corners or edges are required to have an irregular shape, leaving other touch electrode blocks remain in a regular (e.g., rectangular) shape. The difference in shape between the irregularly shaped touch electrode blocks and the regularly shaped touch electrode blocks may affect the touch effect.

SUMMARY

According to some embodiments of the present disclosure, a touch panel is provided, comprising: a substrate; an insulating layer on the substrate; a plurality of touch electrode blocks on a first side of the insulating layer, the plurality of touch electrode blocks comprising an array of first type touch electrode blocks having a regular shape and a second type touch electrode block having an irregular shape; and a plurality of electrode lines on a second side of the insulating layer, the second side being opposite to the first side in a thickness direction of the insulating layer, the plurality of electrode lines extending in a column direction of the array and spaced apart from each other. Each of the first type touch electrode blocks is electrically connected to a respective one of the plurality of electrode lines by respective X first contact vias extending through the insulating layer, and the respective X first contact vias are arranged in a straight line in the column direction. The second type touch electrode block is electrically connected to a first corresponding one of the plurality of electrode lines by Y second contact vias extending through the insulating layer, and the Y second contact vias are arranged along at least one straight line in the column direction. X and Y are natural numbers, and $0.75 \times X \leq Y \leq 1.25 \times X$.

In some embodiments, the plurality of touch electrode blocks are within a touch area of the touch panel, and the touch area has a rectangular shape with a rounded corner. The array of first type touch electrode blocks comprises M rows and N columns, M and N are integers, and $M \geq 2$, $N \geq 2$. The second type touch electrode block is at the rounded corner, and the irregular shape is adapted to the rounded corner such that a part of an outline of the second type touch electrode block is conformal to at least a part of an outline of the rounded corner.

In some embodiments, the second type touch electrode block is aligned with a first column of the N columns of first type touch electrode blocks. Each of the first type touch electrode blocks has a first area. The second type touch electrode block has a second area smaller than the first area.

In some embodiments, the touch area comprises a first edge extending in the column direction and a second edge extending in a row direction of the array. The first edge and the second edge adjoin the rounded corner.

In some embodiments, the first corresponding one of the plurality of electrode lines comprises a body segment extending in the column direction, at least one extending segment spaced apart from and parallel to the body segment, and a connecting segment connecting the body segment and the at least one extending segment. The body segment is closer, in the row direction, to the first edge than respective ones, electrically connected to the first column of first type touch electrode blocks, of the plurality of electrode lines. The at least one extending segment is between the respective ones of the plurality of electrode lines. At least a portion of the Y second contact vias are arranged along the at least one extending segment.

In some embodiments, the connecting segment is at least partially outside the touch area.

In some embodiments, the touch area further comprises a third edge adjoining the second edge and defining a notch of the touch area. The plurality of touch electrode blocks further comprise a third type touch electrode block having an irregular shape adapted to the notch such that a part of an outline of the third type touch electrode block is conformal to a part of an outline of the notch. The third type touch electrode block is on a same side as the second type touch electrode block with respect to the notch. The third type touch electrode block is electrically connected to a second corresponding one of the plurality of electrode lines by Y third contact vias extending through the insulating layer, and the Y third contact vias are arranged in a straight line in the column direction.

In some embodiments, the third type touch electrode block is in parallel with the second type touch electrode block in the row direction. The third type touch electrode block spans at least two columns of the N columns of first type touch electrode blocks in the row direction. The third type touch electrode block has a third area substantially equal to the first area.

In some embodiments, the second corresponding one of the plurality of electrode lines is closer to the first edge than respective ones, electrically connected to the at least two columns of first type touch electrode blocks, of the plurality of electrode lines.

In some embodiments, the second type touch electrode block spans at least two columns of the N columns of first type touch electrode blocks in a row direction of the array. Each of the first type touch electrode blocks has a first area. The second type touch electrode block has a second area substantially equal to the first area.

In some embodiments, the touch area comprises a first edge extending in the column direction and a second edge extending in the row direction. The first edge and the second edge adjoin the rounded corner.

In some embodiments, the first corresponding one of the plurality of electrode lines comprises a body segment extending in the column direction, at least one extending segment spaced apart from and parallel to the body segment, and a connecting segment connecting the body segment and the at least one extending segment. The body segment is closer, in the row direction, to the first edge than respective ones, electrically connected to the at least two columns of first type touch electrode blocks, of the plurality of electrode lines. The at least one extending segment is between the respective ones of the plurality of electrode lines. At least a portion of the Y second contact vias are arranged along the at least one extending segment.

In some embodiments, the connecting segment is at least partially outside the touch area.

In some embodiments, the first corresponding one of the plurality of electrode lines extends along only one straight line in the column direction, such that the Y second contact vias are arranged along the only one straight line in the column direction. The first corresponding one of the plurality of electrode lines is between respective ones, electrically connected to the at least two columns of first type touch electrode blocks, of the plurality of electrode lines.

In some embodiments, the touch area further comprises a third edge adjoining the second edge and defining a notch of the touch area. The plurality of touch electrode blocks further comprise a third type touch electrode block having an irregular shape adapted to the notch such that a part of an outline of the third type touch electrode block is conformal to a part of an outline of the notch. The third type touch electrode block is on a same side as the second type touch electrode block with respect to the notch. The third type touch electrode block is electrically connected to a second corresponding one of the plurality of electrode lines by Y third contact vias extending through the insulating layer, and the Y third contact vias are arranged along a straight line in the column direction.

In some embodiments, the third type touch electrode block is in parallel with the second type touch electrode block in the row direction. The third type touch electrode block spans at least two columns of the N columns of first type touch electrode blocks in the row direction. The third type touch electrode block has a third area substantially equal to the first area.

In some embodiments, the second corresponding one of the plurality of electrode lines comprises a body segment extending in the column direction, at least one extending segment spaced apart from and parallel to the body segment, and a connecting segment connecting the body segment and the at least one extending segment. The body segment is closer, in the row direction, to the first edge than respective ones, electrically connected to the at least two columns of first type touch electrode blocks, of the plurality of electrode lines. The at least one extending segment is between the respective ones of the plurality of electrode lines. At least a portion of the Y second contact vias are arranged along the at least one extending segment.

In some embodiments, the connecting segment is at least partially outside the touch area.

In some embodiments, the second corresponding one of the plurality of electrode lines extends along only one straight line in the column direction, such that the Y third contact vias are arranged along the only one straight line in the column direction. The second corresponding one of the plurality of electrode lines is between respective ones, electrically connected to the at least two columns of first type touch electrode blocks, of the plurality of electrode lines.

According to some embodiments, a touch display device is provided comprising a touch panel. The touch panel comprises: a substrate; an insulating layer on the substrate; a plurality of touch electrode blocks on a first side of the insulating layer, the plurality of touch electrode blocks comprising an array of first type touch electrode blocks having a regular shape and a second type touch electrode block having an irregular shape; and a plurality of electrode lines on a second side of the insulating layer, the second side being opposite to the first side in a thickness direction of the insulating layer, the plurality of electrode lines extending in a column direction of the array and spaced apart from each other. Each of the first type touch electrode blocks is electrically connected to a respective one of the plurality of electrode lines by respective X first contact vias extending through the insulating layer, and the respective X first contact vias are arranged in a straight line in the column direction. The second type touch electrode block is electrically connected to a first corresponding one of the plurality of electrode lines by Y second contact vias extending through the insulating layer, and the Y second contact vias are arranged along at least one straight line in the column direction. X and Y are natural numbers, and $0.75 \times X \leq Y \leq 1.25 \times X$.

BRIEF DESCRIPTION OF THE DRAWINGS

Further details, features and advantages of the present disclosure are disclosed in the following description of exemplary embodiments in conjunction with the accompanying drawings in which.

DETAILED DESCRIPTION

Figure 1A:
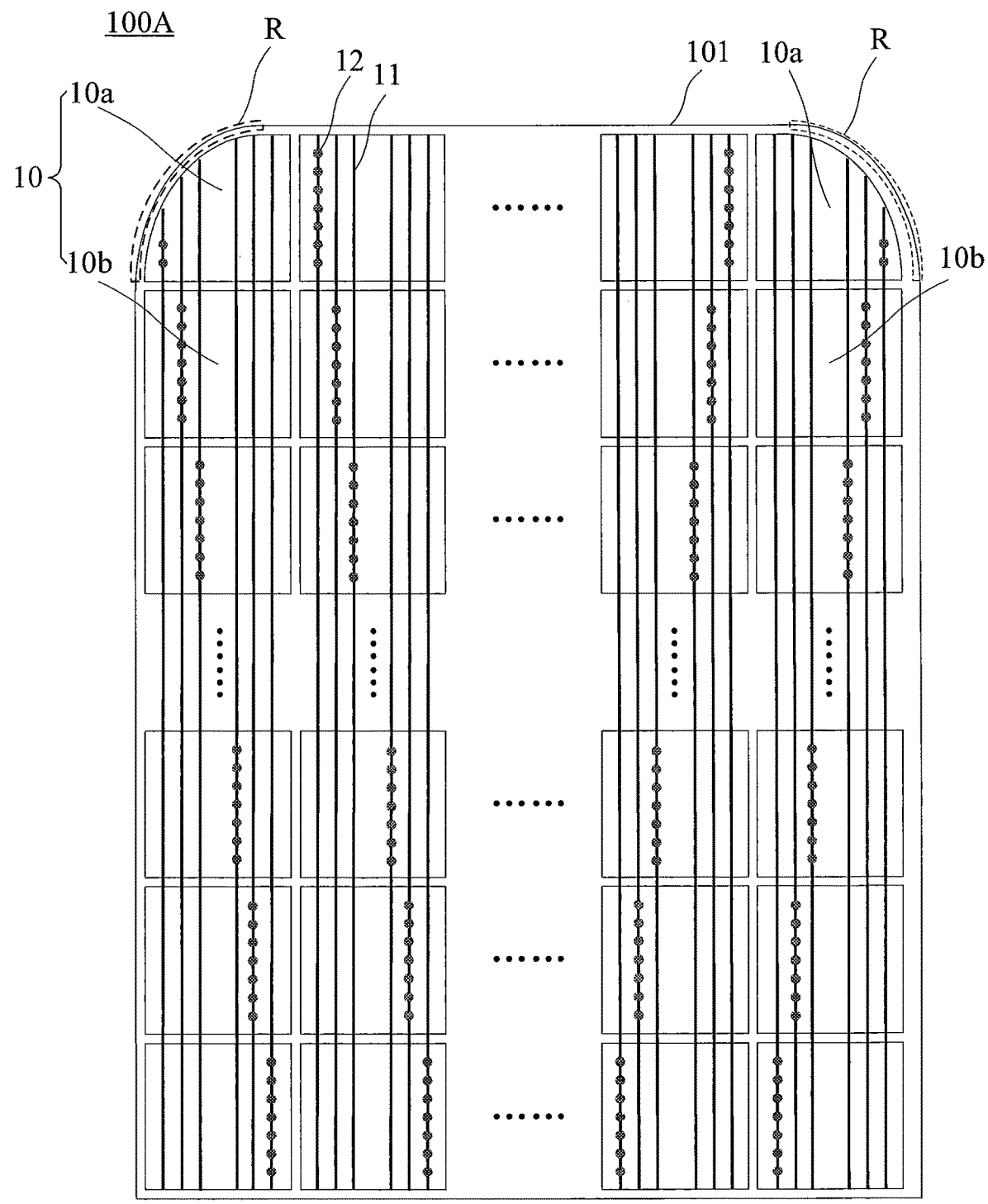
FIG. 1A is a schematic plan view of a touch panel in related art.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the FIGS. are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1A is a schematic plan view of a touch panel 100A in related art.

As shown in FIG. 1A, the touch panel 100A has two rounded corners R (a top left one and a top right one). A plurality of touch electrode blocks 10 are arranged in a touch area 101, wherein the touch electrode blocks 10a at the rounded corners R each have a fan shape, and the touch electrode blocks 10b other than the touch electrode blocks 10a each have a rectangular shape. Each of the touch electrode blocks 10a and 10b is electrically connected to a respective electrode line 11 by a respective plurality of contact vias 12. The respective electrode lines 11 are used to transfer touch drive/sensing signals to/from respective ones of the touch electrode blocks 10a and 10b.

In general, each of the rectangular touch electrode blocks 10b has a size of about 4 mm×4 mm. Such a size allows the rectangular touch electrode block 10b to be connected to a corresponding one of the electrode lines 11 by a sufficient number of contact vias 12, thus ensuring good touch detection performance. However, due to the difference in shape between the fan-shaped touch electrode block 10a and the rectangular touch electrode block 10b, the number of contact vias 12 connected to the fan-shaped touch electrode block 10a is less than the number of those connected to the rectangular touch electrode block 10b. The larger the radius of the rounded corner R, the smaller the number of contact vias 12 connected to the fan-shaped touch electrode block 10a. In the case where the radius of the rounded corner R is larger than 4 mm, it may even be impossible to make an electrical connection between the fan-shaped touch electrode block 10a and the corresponding electrode line 11. As a result, the touch panel 100A is not suitable for application scenarios where the touch area is required to have rounded corners with a large radius.

Figure 1B:
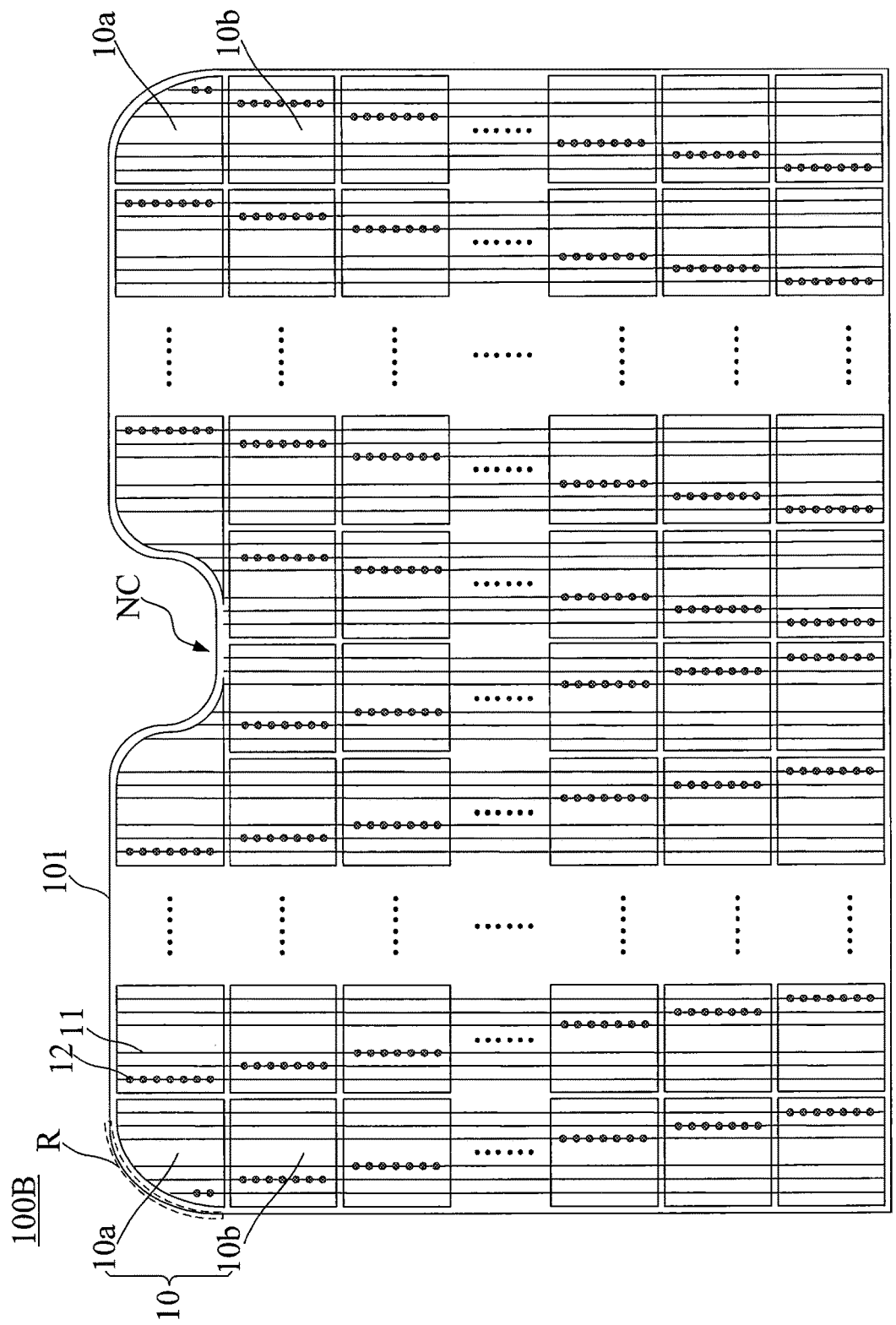
FIG. 1B is a schematic plan view of another touch panel in the related art.

FIG. 1B is a schematic plan view of a touch panel 100B in the related art.

As shown in FIG. 1B, in addition to the upper left rounded corner and the upper right rounded corner, the touch panel 100B is further provided with a notch NC at its upper edge. This notch NC may be provided for accommodating, for example, camera assemblies.

At the rounded corner R, the touch panel 100B has the same problem as the touch panel 100A, that is, the touch electrode block 10a at the rounded corner R is provided with less contact vias 12 to make an electrical connection with the corresponding electrode line 11, compared with the regularly shaped touch electrode block 10b. As mentioned earlier, this can result in degraded touch detection performance.

Figure 2:
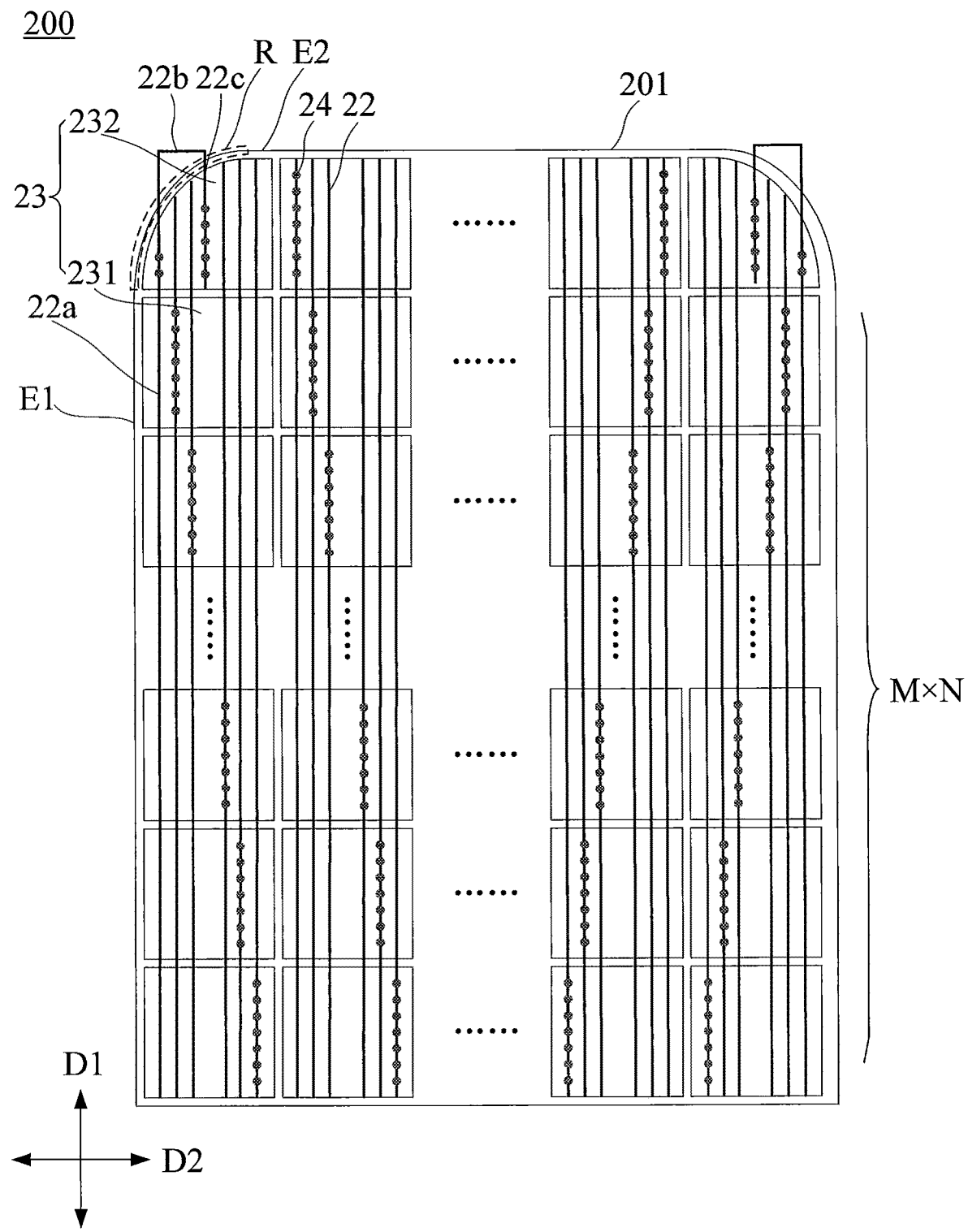
FIG. 2 is a schematic plan view of a touch panel according to an embodiment of the present disclosure.

FIG. 2 is a schematic plan view of a touch panel 200 according to an embodiment of the present disclosure.

Referring to FIG. 2, the touch panel 200 includes a touch area 201 within which a plurality of touch electrode blocks 23 are arranged. The touch area 201 has a substantially rectangular shape with a rounded corner R. The touch area 201 includes a first edge E1 extending in a column direction D1 and a second edge E2 extending in a row direction D2, wherein the first edge E1 and the second edge E2 adjoin the rounded corner R.

The plurality of touch electrode blocks 23 function as mutual-capacitive type or self-capacitive type touch sensors, and are independent of each other. In the case where the touch panel 200 is integrated with an organic light emitting diode (OLED) display panel, the touch electrode blocks 23 may be realized, for example, by dividing a cathode layer in the OLED display panel into blocks. In the case where the touch panel 200 is integrated with a liquid crystal display (LCD) panel, the touch electrode blocks 23 may be realized, for example, by dividing a common electrode layer in the LCD panel into blocks. Other embodiments are of course also possible.

The plurality of touch electrode blocks 23 include an array of first type touch electrode blocks 231 having a regular (rectangular in this example) shape and a second type touch electrode block 232 having an irregular (fan-shaped in this example) shape. In other embodiments, each of the first type touch electrode blocks 231 may have other regular shapes, such as a diamond shape, and the second type touch electrode block 232 may have other irregular shapes, for example, other non-quadrilateral shapes, depending on the outline of the touch area 201.

The array of first type touch electrode blocks 231 is arranged in M rows and N columns, where M and N are integers, M≥2, and N≥2. The second type touch electrode block 232 is located at the rounded corner R, and its irregular shape is adapted to the rounded corner R such that a part of the outline of the second type touch electrode block 232 is conformal to at least a part of the outline of the rounded corner R. In this example, the second type touch electrode block 232 is aligned with the first column of the N columns of first type touch electrode blocks 231. Each of the first type touch electrode blocks 231 has a first area, and the second type touch electrode block 232 has a second area that is smaller than the first area.

A plurality of electrode lines 22 extend in the column direction D1 and are spaced apart from each other. The electrode lines 22 are used to transfer touch drive/sensing signals to/from respective ones of the touch electrode blocks 23.

Each of the first type touch electrode blocks 231 is electrically connected to a respective one of the plurality of electrode lines 22 by respective X contact vias 24 (X being a natural number), and the respective X contact vias 24 are arranged along a straight line in the column direction D1.

The second type touch electrode block 232 is electrically connected to a corresponding one of the plurality of electrode lines 22 by Y contact vias 24 (Y being a natural number), and the Y contact vias 24 are arranged along two straight lines in the column direction D1.

In this embodiment, the corresponding electrode line 22 electrically connected to the second type touch electrode block 232 includes a body segment 22a extending in the column direction D1, an extending segment 22c spaced apart from and parallel to the body segment 22a, and a connecting segment 22b connecting the body segment 22a and the extending segment 22c. The body segment 22a is closer to the first edge E1 of the touch area 201 in the row direction D2 than respective electrode lines 22 that are electrically connected to the first column of first type touch electrode blocks 231. The extending segment 22c is located between the respective electrode lines 22. The connecting segment 22b is at least partially outside the touch area 201.

Due to the presence of the extending segment 22c, the second type touch electrode block 232 can be electrically connected to more contact vias 24. In the example of FIG. 2, the body segment 22a and the extending segment 22c are electrically connected to two and five contact vias 24, respectively, such that the second type touch electrode block 232 has the same number (seven) of contact vias 24 as the first type touch electrode block 231. In other embodiments, the second type touch electrode block 232 may be electrically connected to substantially the same number of contact vias 24 as the first type touch electrode block 231.

More generally, the number X of contact vias 24 electrically connected to the first type touch electrode block 231 and the number Y of contact vias 24 electrically connected to the second type touch electrode block 232 may satisfy $0.75 \times X \leq Y \leq 1.25 \times X$. This allows a relatively uniform distribution of the contact vias 24 across the touch electrode blocks, facilitating an improvement in touch detection performance.

Figure 3:
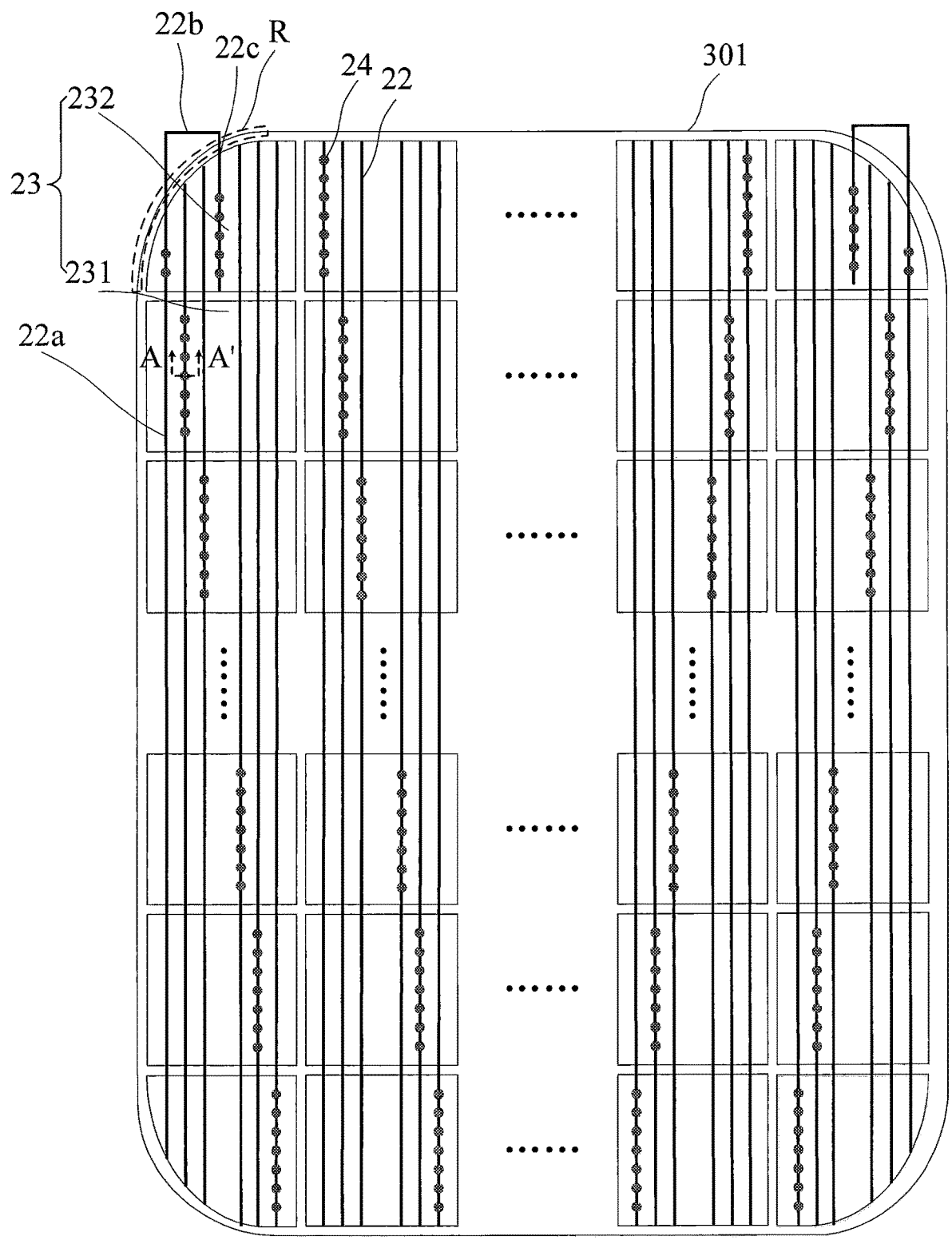
FIG. 3 is a schematic plan view of a touch panel according to an embodiment of the present disclosure.

FIG. 3 is a schematic plan view of a touch panel 300 according to an embodiment of the present disclosure.

Referring to FIG. 3, the touch panel 300 has substantially the same configuration as the touch panel 200 of FIG. 2 except that the touch panel 300 is further provided with a lower left rounded corner and a lower right rounded corner. For the sake of brevity, the touch panel 300 is not described in detail herein.

Figure 4:
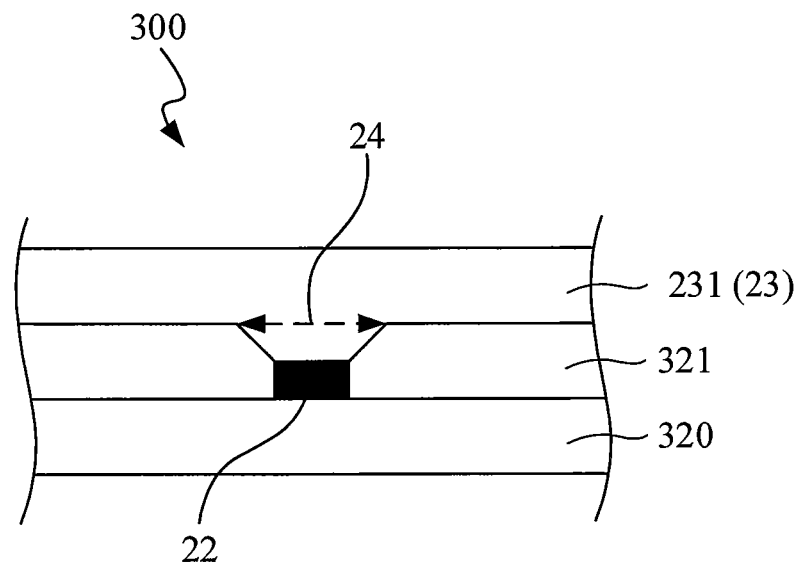
FIG. 4 is a schematic cross-sectional view taken along line A-A' of FIG. 3.

FIG. 4 is a schematic cross-sectional view taken along line A-A' of FIG. 3.

Referring to FIG. 4, the touch panel 300 includes a substrate 320 and an insulating layer 321 on the substrate 320. The first type touch electrode block 231 (or equally, all of the touch electrode blocks 23) is located on a first side (the upper side in the figure) of the insulating layer 321, and the electrode line 22 is located on a second side (the lower side in the figure) of the insulating layer 321. The second side is opposite to the first side in the thickness direction of the insulating layer 321. The contact via 24 extends through the insulating layer 321 to electrically connect the first type touch electrode block 231 to the electrode line 22.

It will be understood that the configuration shown in FIG. 4 is exemplary. In other embodiments, the touch electrode block 23 may be located on a side of the insulating layer 321 closer to the substrate 320, and the electrode line 22 may be located on a side of the insulating layer 321 away from the substrate 320.

Figure 5:
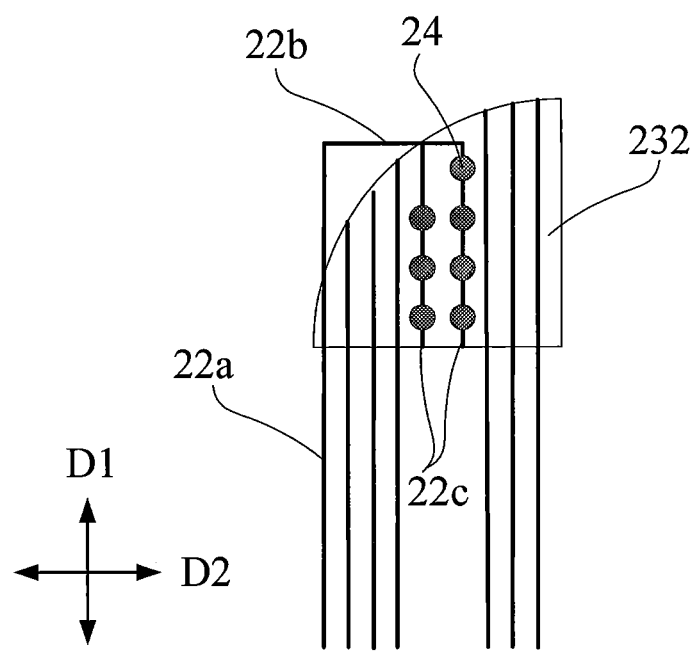
FIG. 5 is a partial schematic view showing a variation of the wiring of the second type touch electrode block in the touch panel of FIG. 3.

FIG. 5 is a partial schematic view showing a variation of the wiring of the second type touch electrode block 232 in the touch panel 300 of FIG. 3.

Referring to FIG. 5, in this embodiment, the electrode line 22 electrically connected to the second type touch electrode block 232 includes a body segment 22a extending in the column direction D1, two extending segments 22c spaced apart from and parallel to the body segment 22a, and a connecting segment 22b connecting the body segment 22a and the two extending segments 22c. Due to the presence of these two extending segments 22c, no contact vias 24 are electrically connected to the body segment 22a, but all of seven contact vias 24 are electrically connected to the two extending segments 22c.

It will be understood that the configuration shown in FIG. 5 is exemplary. In other embodiments, the electrode line 22 electrically connected to the second type touch electrode block 232 may, where applicable, include more extending segments 22c.

Figure 6:
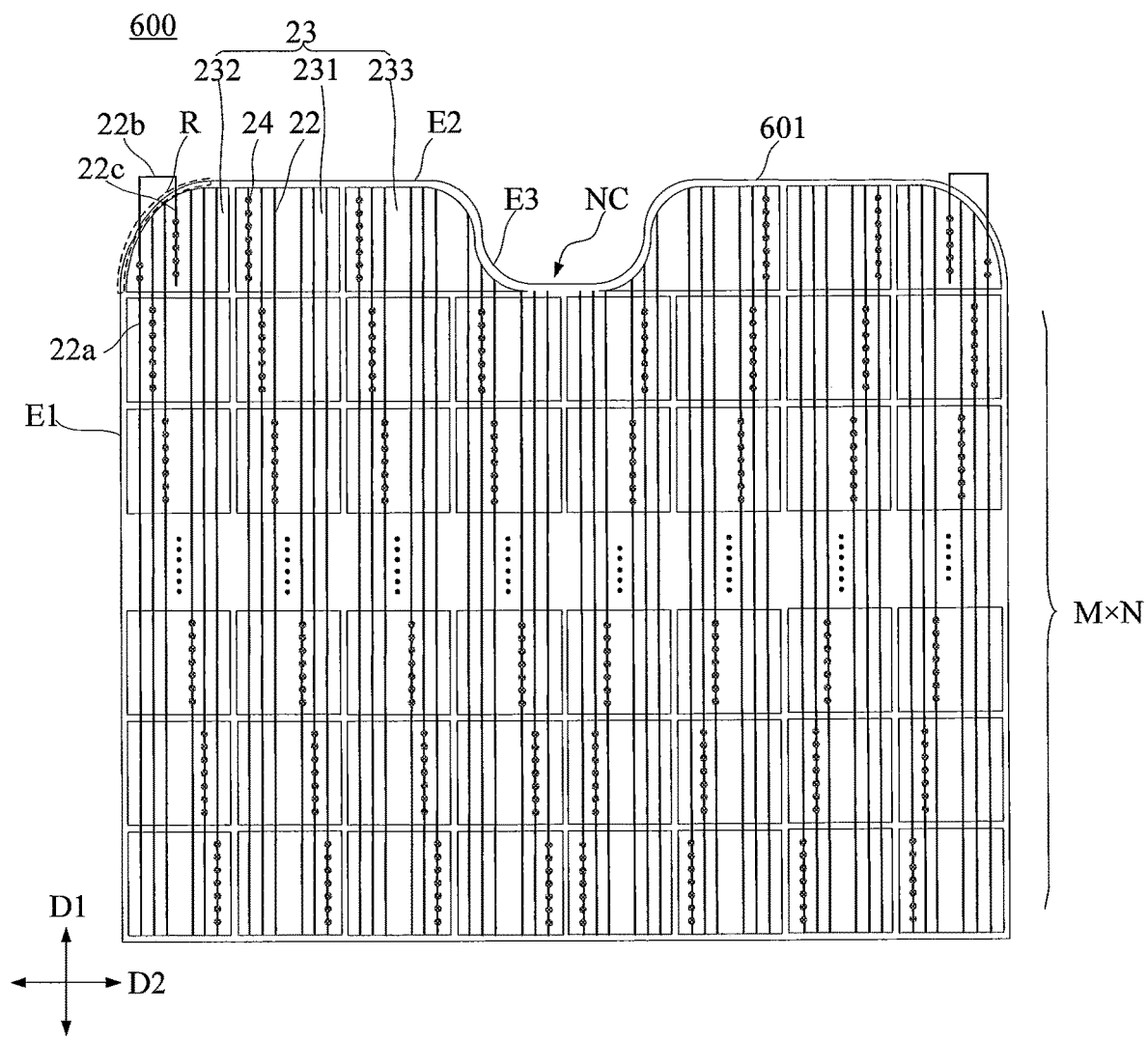
FIG. 6 is a schematic plan view of a touch panel according to an embodiment of the present disclosure.

FIG. 6 is a schematic plan view of a touch panel 600 in accordance with an embodiment of the present disclosure.

Referring to FIG. 6, the touch panel 600 includes a touch area 601 within which a plurality of touch electrode blocks 23 are arranged. The touch area 601 has a rectangular shape with a rounded corner R. The touch area 601 includes a first edge E1 extending in a column direction D1 and a second edge E2 extending in a row direction D2, wherein the first edge E1 and the second edge E2 adjoin the rounded corner R.

The touch panel 600 has substantially the same configuration as the touch panel 200 of FIG. 2 except that the touch area 601 is further provided with a notch NC. Specifically, the touch area 601 further includes a third edge E3 that adjoins the second edge E2 and defines the notch NC.

The plurality of touch electrode blocks 23 further includes a third type touch electrode block 233. The third type touch electrode block 233 has an irregular shape adapted to the notch NC such that a part of the outline of the third type touch electrode block 233 is conformal to a part of the outline of the notch NC. The third type touch electrode block 233 is located on the same side as the second type touch electrode block 232 with respect to the notch NC.

The third type touch electrode block 233 is electrically connected to a corresponding one of the plurality of electrode lines 22 by Y contact vias 24, and the Y contact vias 24 are arranged in a straight line in the column direction D1. The third type touch electrode block 233 is arranged in parallel with the second type touch electrode block 232 in the row direction D2. The third type touch electrode block 233 spans at least two columns of the M×N array of first type touch electrode blocks 231 in the row direction D2 such that the third type touch electrode block 233 has an area substantially equal to the area of the first type touch electrode block 231. In this context, "A substantially equal to B" means that A is in the range of, for example, 90%×B to 110%×B.

The electrode line 22 electrically connected to the third type touch electrode block 233 extends in only one straight line in the column direction D1 such that the Y contact vias 24 are arranged along the only one straight line in the column direction D2. The electrode line 22 electrically connected to the third type touch electrode block 233 is closer to the first edge E1 of the touch area 601 than respective electrode lines 22 electrically connected to the at least two columns of first type touch electrode blocks 231 spanned by the third type touch electrode block 233.

Figure 7:
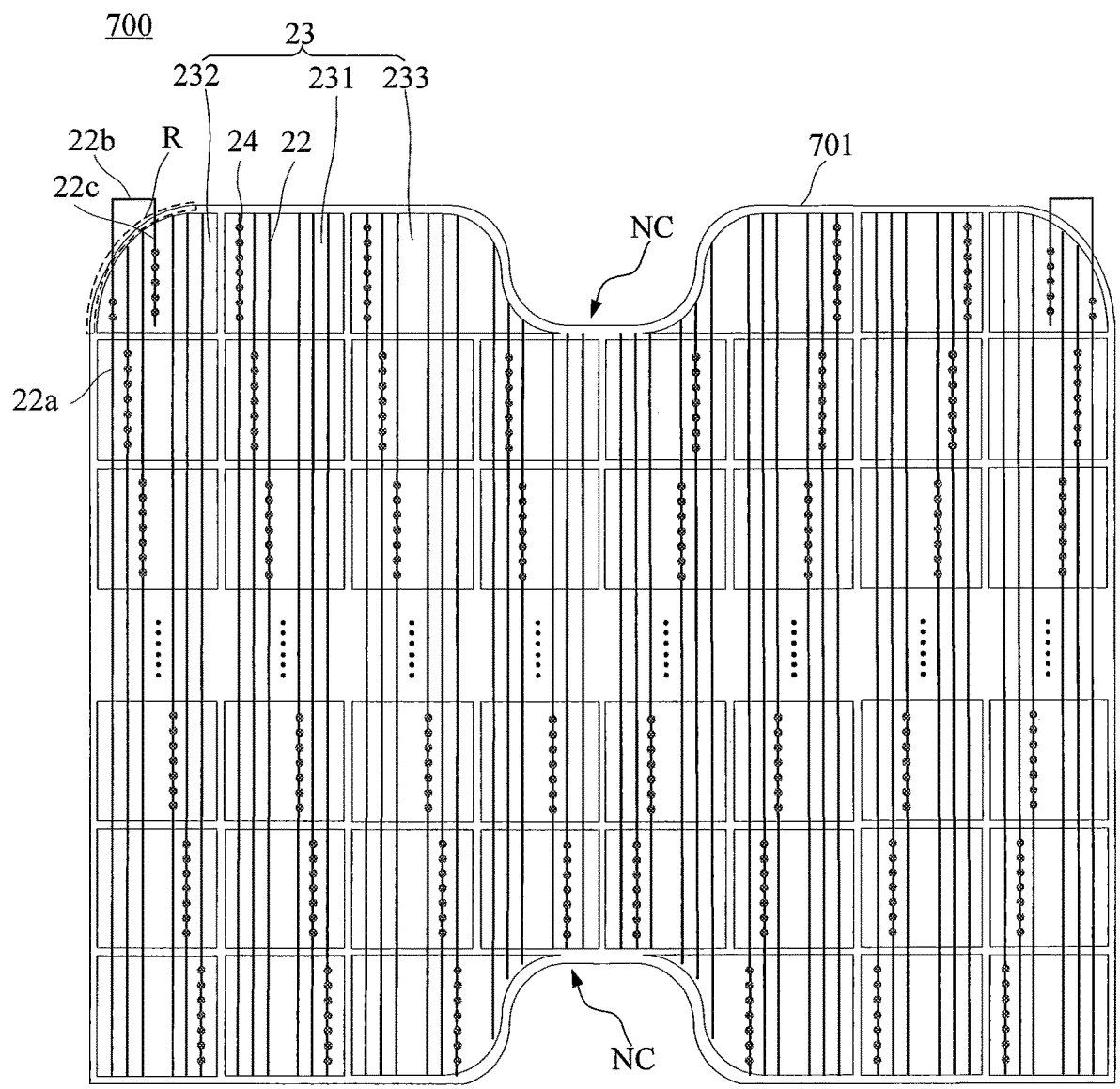
FIG. 7 is a schematic plan view of a touch panel according to an embodiment of the present disclosure.

FIG. 7 is a schematic plan view of a touch panel 700 according to an embodiment of the present disclosure.

Referring to FIG. 7, the touch panel 700 has substantially the same configuration as the touch panel 600 of FIG. 6 except that the touch panel 700 is further provided with an additional notch NC at the bottom edge. For the sake of brevity, the touch panel 700 is not described in detail herein.

Figure 8:
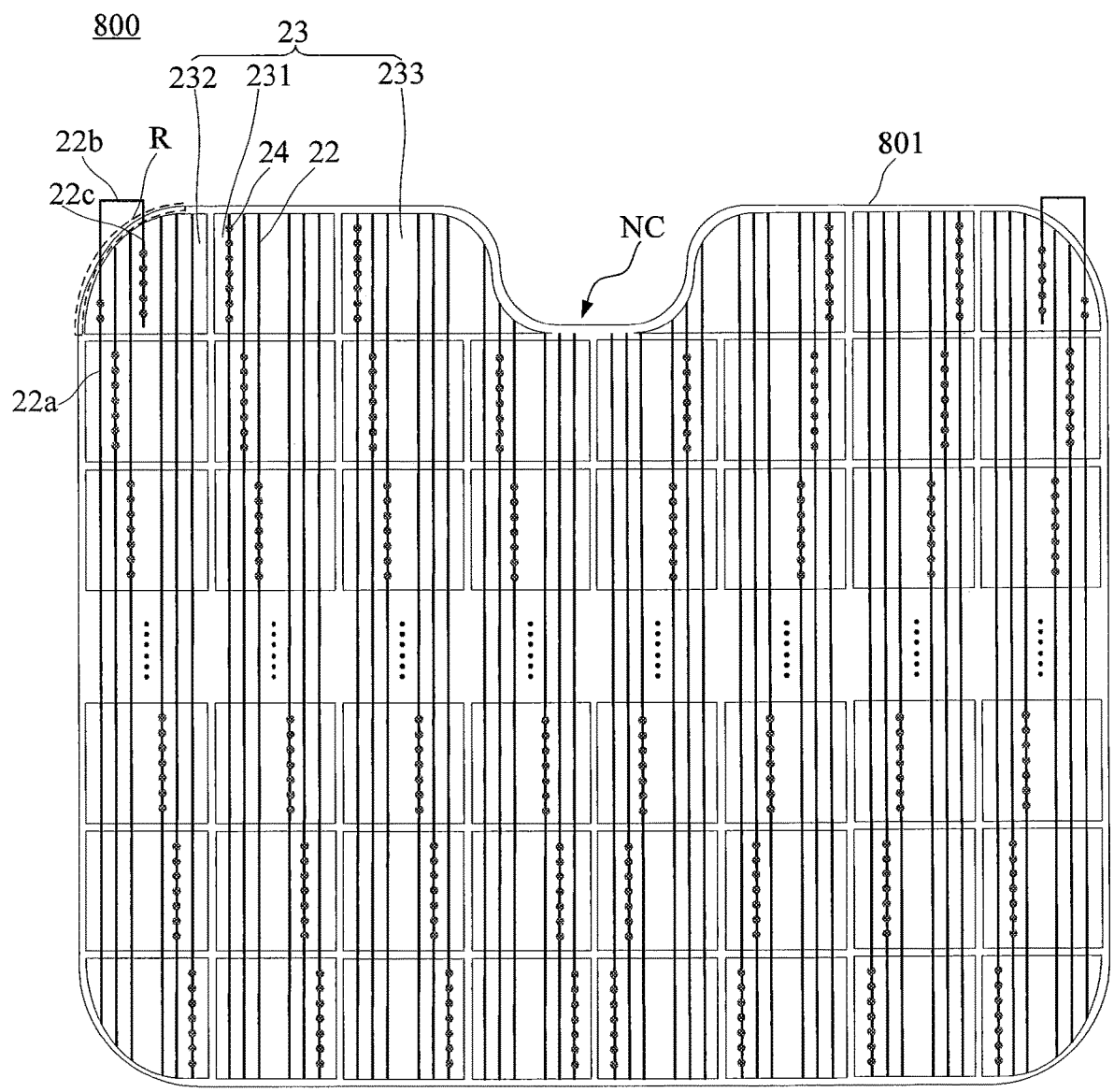
FIG. 8 is a schematic plan view of a touch panel according to an embodiment of the present disclosure.

FIG. 8 is a schematic plan view of a touch panel 800 in accordance with an embodiment of the present disclosure.

Referring to FIG. 8, the touch panel 800 has substantially the same configuration as the touch panel 600 of FIG. 6 except that the touch panel 800 is further provided with a left lower rounded corner and a lower right rounded corner. For the sake of brevity, the touch panel 800 is not described in detail herein.

In the embodiments illustrated above with respect to FIGS. 6-8, the second type touch electrode block 232 is aligned with a column of first type touch electrode blocks 231 that is closest to the first edge E1, such that the second type touch electrode block 232 has an area smaller than that of the first type touch electrode block 231, and the third type touch electrode block 233 has an area larger than that of the first type touch electrode block 231. This can be further improved to alleviate or eliminate the deterioration of touch performance resulting from the difference in area between the first, second, and third type touch electrode blocks.

Figure 9:
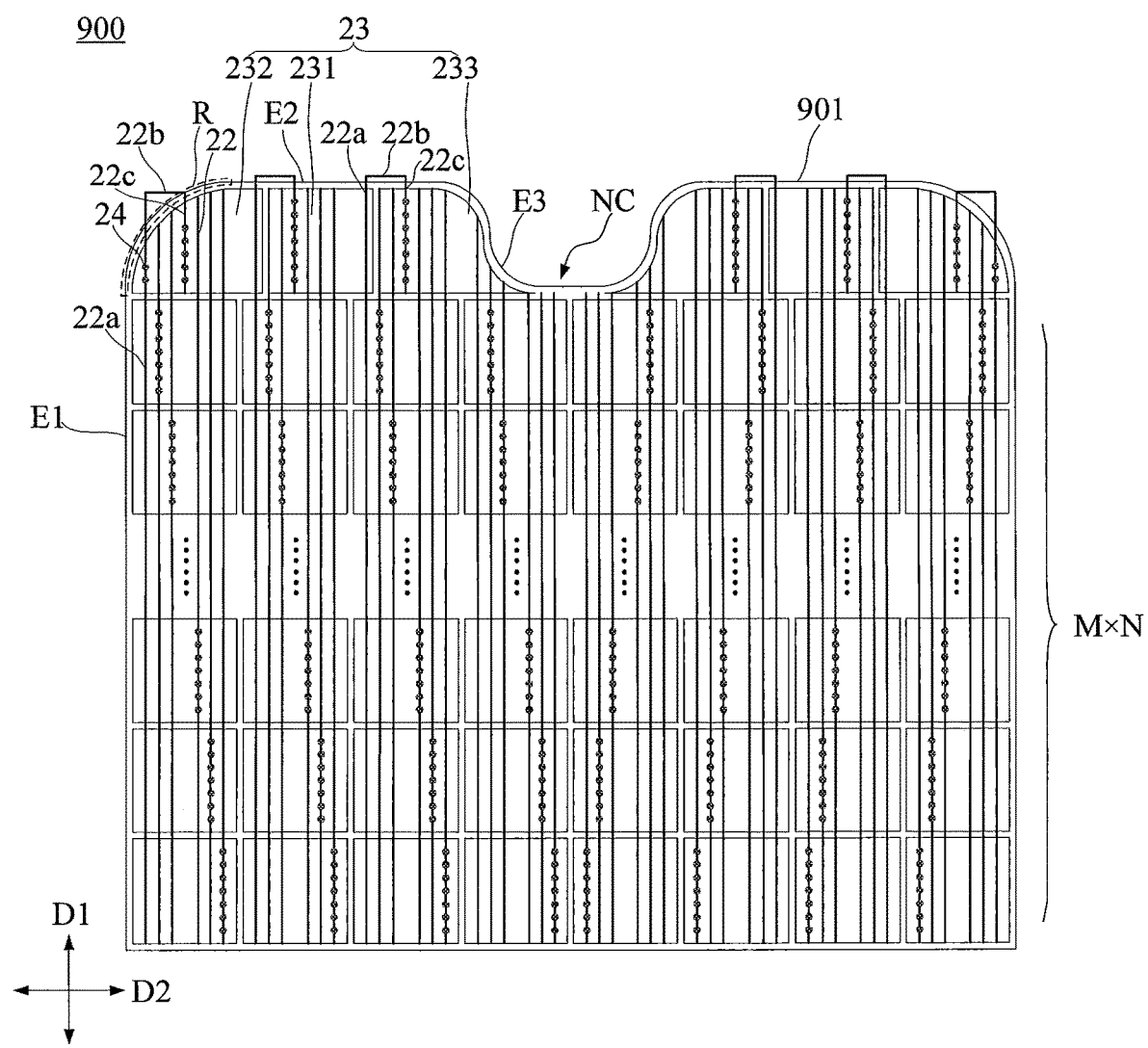
FIG. 9 is a schematic plan view of a touch panel according to an embodiment of the present disclosure.

FIG. 9 is a schematic plan view of a touch panel 900 according to an embodiment of the present disclosure.

Referring to FIG. 9, the touch panel 900 includes a touch area 901 within which a plurality of touch electrode blocks 23 are arranged. The touch area 901 has a rectangular shape with a rounded corner R. The touch area 901 includes a first edge E1 extending in a column direction D1 and a second edge E2 extending in a row direction D2, wherein the first edge E1 and the second edge E2 adjoin the rounded corner R.

The plurality of touch electrode blocks 23 include an M×N array of first type touch electrode blocks 231 and a second type touch electrode block 232. The second type touch electrode block 232 is electrically connected to a corresponding one of a plurality of electrode lines 22 by Y contact vias 24, and the Y contact vias 24 are arranged along two straight lines in the column direction D1. This is similar to the configuration of the touch panel 600 shown in FIG. 6, and will not be described in detail herein.

Different from the touch panel 600, in the touch panel 900, the second type touch electrode block 232 spans at least two columns of the M×N array of first type touch electrode blocks 231 in the row direction D2, such that the second type touch electrode block 232 has an area substantially equal to the area of the first type touch electrode block 231.

The touch area 901 is further provided with a notch NC. Specifically, the touch area 901 further includes a third edge E3 that adjoins the second edge E2 and defines the notch NC.

The plurality of touch electrode blocks 23 further include a third type touch electrode block 233. The third type touch electrode block 233 has an irregular shape adapted to the notch NC such that a part of the outline of the third type touch electrode block 233 is conformal to a part of the outline of the notch NC. The third type touch electrode block 233 is located on the same side as the second type touch electrode block 232 with respect to the notch NC.

The third type touch electrode block 233 is arranged in parallel with the second type touch electrode block 232 in the row direction D2. The third type touch electrode block 233 spans at least two columns of the M×N array of first type touch electrode blocks 231 in the row direction D2 such that the third type touch electrode block 233 has an area substantially equal to the area of the first type touch electrode block 231.

The third type touch electrode block 233 is electrically connected to a corresponding one of the plurality of electrode lines 22 by Y contact vias 24, and this corresponding electrode line 22 extends along two straight lines in the column direction D1.

As shown in FIG. 9, this corresponding electrode line 22 includes a body segment 22a extending in the column direction D1, an extending segment 22c spaced apart from and parallel to the body segment 22*a*, and a connecting segment 22*b* connecting the body segment 22*a* and the extending segment 22*c*. The body segment 22*a* is closer, in the row direction D2, to the first edge E1 of the touch area 901 than respective electrode lines 22 electrically connected to the at least two columns of first type touch electrode blocks 231 spanned by the third type touch electrode block 233. The extending segment 22*c* is located between these respective electrode lines 22. All of the Y contact vias 24 are arranged along the extending segment 22*c*. The connecting segment 22*b* is at least partially outside the touch area 901.

Figure 10:
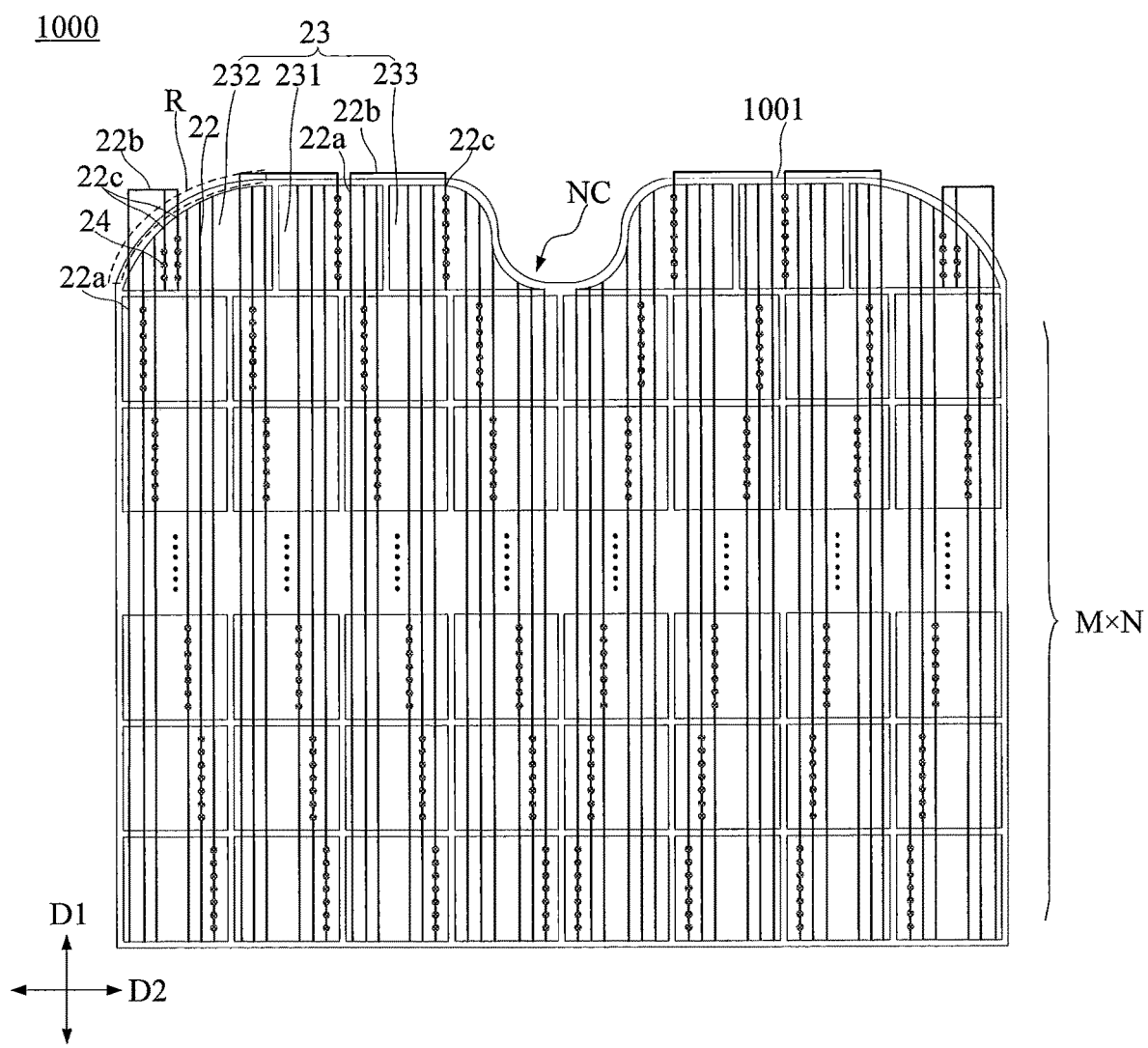
FIG. 10 is a schematic plan view of a touch panel according to an embodiment of the present disclosure.

FIG. 10 is a schematic plan view of a touch panel 1000 according to an embodiment of the present disclosure.

Referring to FIG. 10, the touch panel 1000 includes a touch area 1001 within which a plurality of touch electrode blocks 23 are arranged. The touch area 1001 has a rectangular shape with a rounded corner R. The touch area 1001 includes a first edge E1 extending in a column direction D1 and a second edge E2 extending in a row direction D2, wherein the first edge E1 and the second edge E2 adjoin the rounded corner R. The touch area 1001 is further provided with a notch NC. Specifically, the touch area 1001 further includes a third edge E3 that adjoins the second edge E2 and defines the notch NC.

Unlike the touch panel 900 of FIG. 9, in the touch panel 1000, the electrode line 22 electrically connected to the second type touch electrode block 232 includes two extending segments 22*c*, as shown in FIG. 10. In this example, all of the Y contact vias 24 electrically connected to the second type touch electrode block 232 are arranged along those two extending segments 22*c*, with no contact vias 24 being electrically connected to the body segment 22*a*.

It will be understood that the touch panel 1000 illustrated in FIG. 10 is exemplary. In some embodiments, some of the Y contact vias 24 may be arranged along the body segment 22*a*. In some embodiments, the electrode line 22 electrically connected to the second type touch electrode block 232 may include more than two extending segments 22*c*.

Similar to the touch panel 900, in the touch panel 1000, the body segment 22*a* of the electrode line 22 electrically connected to the third type touch electrode block 233 is closer, in the row direction D2, to the first edge E1 of the touch area 1001 than respective electrode lines 22 electrically connected to the at least two columns of first type touch electrode blocks 231 spanned by the third type touch electrode block 233. However, in the touch panel 1000, the extending segment 22*c* of the electrode line 22 electrically connected to the third type touch electrode block 233 is farther away from the first edge E1 as compared in the touch panel 900. Specifically, the extending segment 22*c* is farther, in the row direction D2, away from the first edge E1 than the electrode lines 22 electrically connected to a column of first type touch electrode blocks 231 which is closest to the first edge E1 among the columns of first type touch electrode blocks 231 spanned by the third type touch electrode block 233, but is closer to the first edge E1 than the electrode lines 22 electrically connected to the remaining columns of first type touch electrode blocks 231 spanned by the third type touch electrode block 233.

Figure 11:
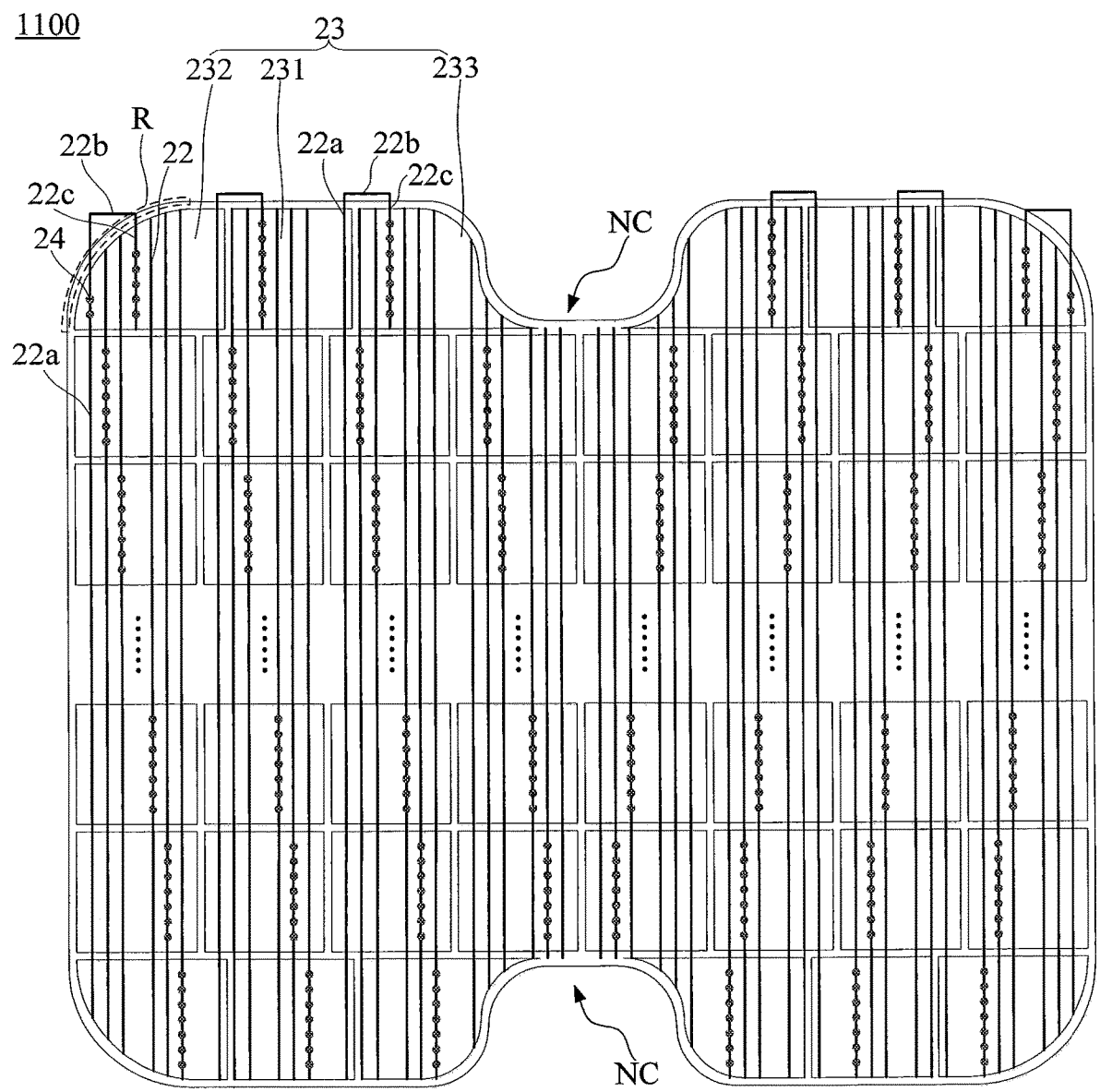
FIG. 11 is a schematic plan view of a touch panel according to an embodiment of the present disclosure.

FIG. 11 is a schematic plan view of a touch panel 1100 according to an embodiment of the present disclosure.

Referring to FIG. 11, the touch panel 1100 has substantially the same configuration as the touch panel 900 of FIG. 9 except that the touch panel 1100 is further provided with an additional notch NC at the bottom edge. For the sake of brevity, the touch panel 1100 is not described in detail herein.

Figure 12:
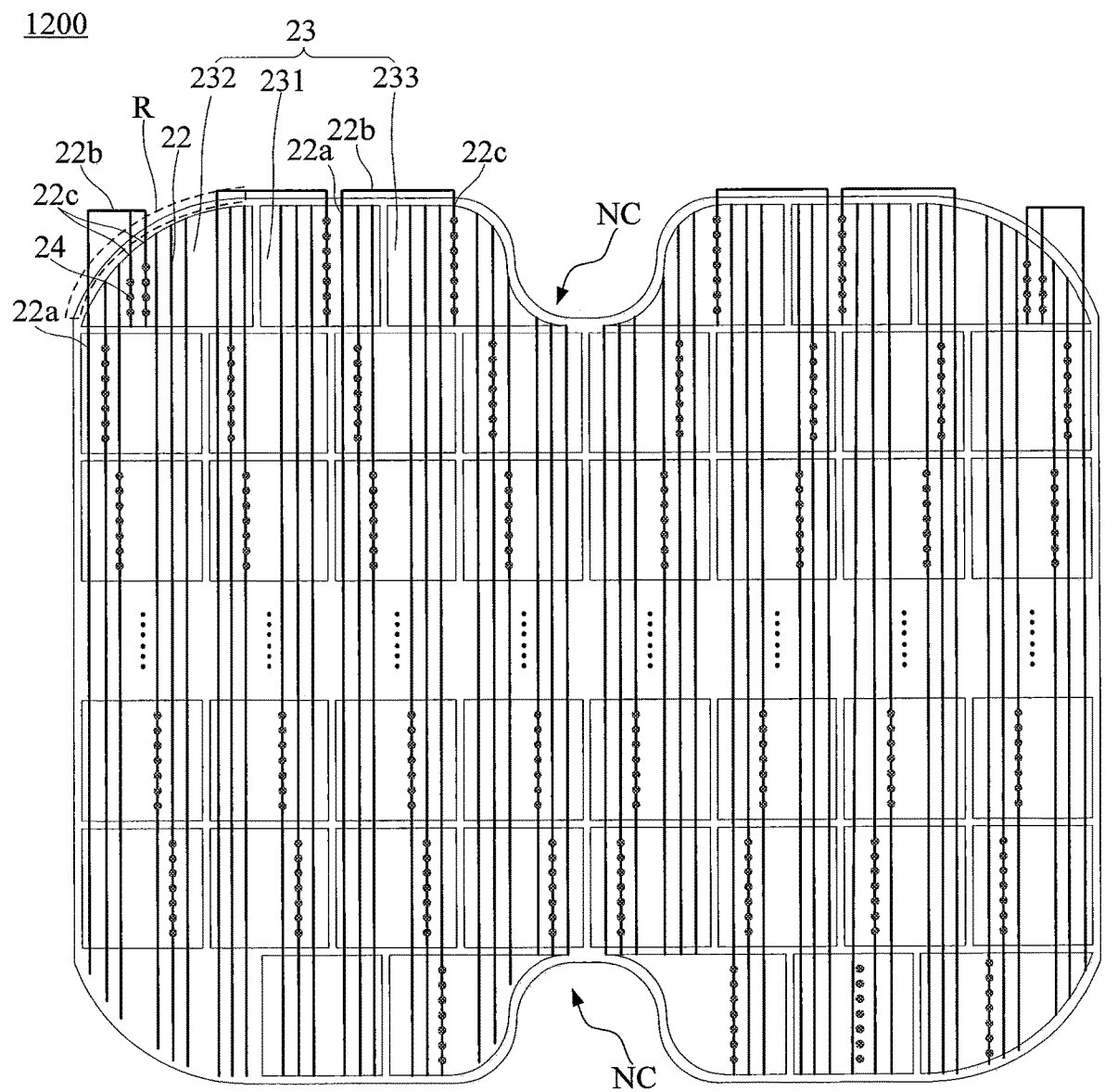
FIG. 12 is a schematic plan view of a touch panel according to an embodiment of the present disclosure.

FIG. 12 is a schematic plan view of a touch panel 1200 according to an embodiment of the present disclosure.

Referring to FIG. 12, the touch panel 1200 has substantially the same configuration as the touch panel 1000 of FIG. 10 except that the touch panel 1200 is further provided with an additional notch NC at the bottom edge, a lower left rounded corner, and a lower right rounded corner. For the sake of brevity, the touch panel 1200 is not described in detail herein.

Figure 13:
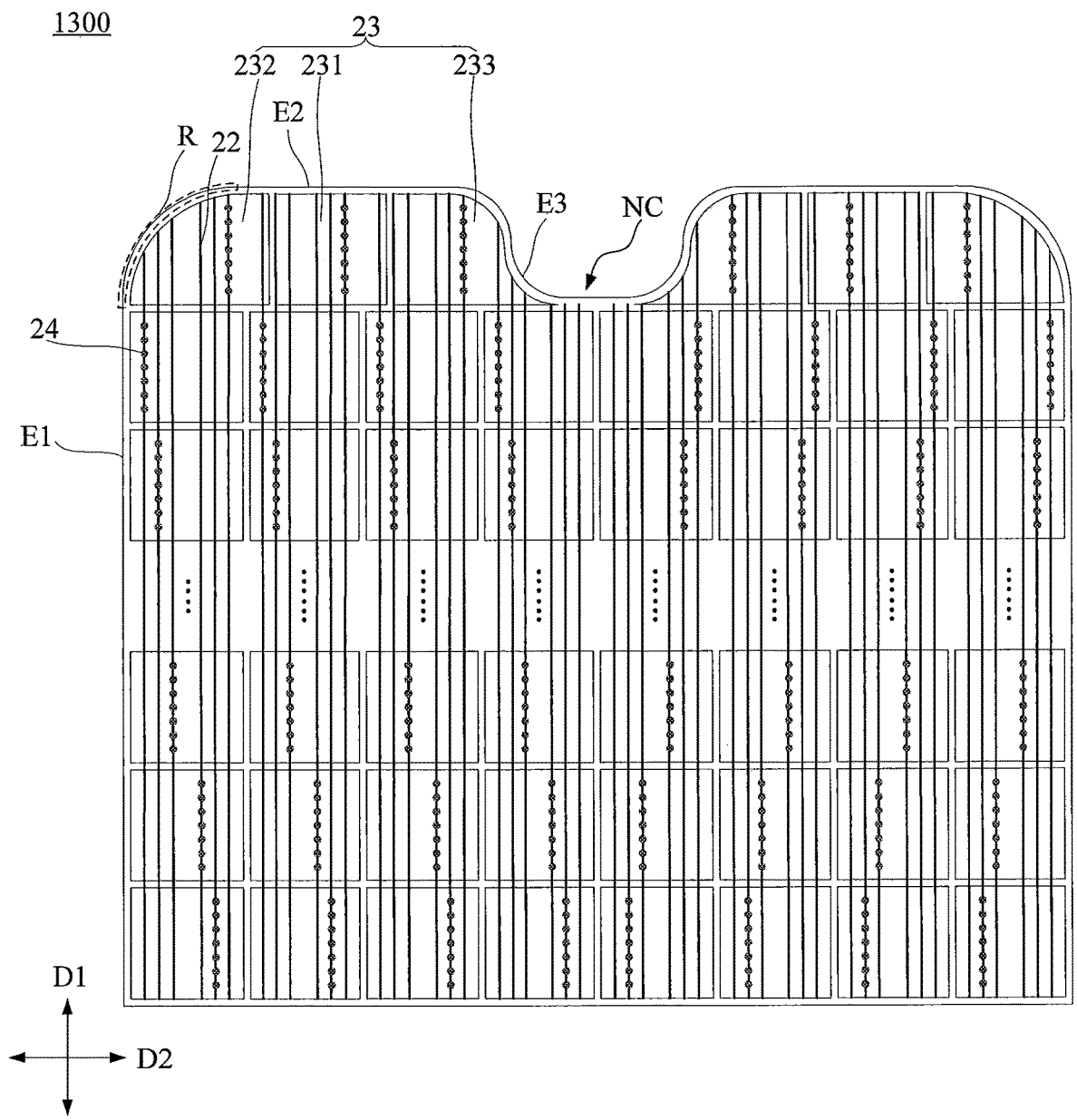
FIG. 13 is a schematic plan view of a touch panel according to an embodiment of the present disclosure.

FIG. 13 is a schematic plan view of a touch panel 1300 according to an embodiment of the present disclosure.

Referring to FIG. 13, the touch panel 1300 has the same touch electrode block arrangement as the touch panel 900 of FIG. 9, and a detailed description thereof is omitted herein for the sake of brevity.

Unlike the touch panel 900, in the touch panel 1300, the electrode line 22 electrically connected to the second type touch electrode block 232 extends along only one straight line in the column direction D1, such that the Y contact vias 24 electrically connected to the electrode line 22 are arranged along the only one straight line in the column direction D1. The electrode line 22 electrically connected to the second type touch electrode block 232 is located between respective electrode lines 22 electrically connected to at least two columns of first type touch electrode blocks 231 spanned by the second type touch electrode block 232. Specifically, the electrode line 22 electrically connected to the second type touch electrode block 232 is farther, in the row direction D2, away from the first edge E1 than the electrode lines 22 electrically connected to a column of first type touch electrode blocks 231 which is closest to the first edge E1 in the row direction D2 among the columns of first type touch electrode blocks 231 spanned by the second type touch electrode block 232, but is closer to the first edge E1 than the electrode lines 22 electrically connected to the remaining columns of first type touch electrode blocks 231 spanned by the second type touch electrode block 232.

Still different from the touch panel 900, in the touch panel 1300, the electrode line 22 electrically connected to the third type touch electrode block 233 extends along only one straight line in the column direction D1, such that the Y contact vias 24 electrically connected to this electrode line 22 are arranged along the only one straight line in the column direction D1. The electrode line 22 electrically connected to the third type touch electrode block 233 is located between respective electrode lines 22 electrically connected to at least two columns of first type touch electrode blocks 231 spanned by the third type touch electrode block 233. Specifically, the electrode line 22 electrically connected to the third type touch electrode block 233 is farther, in the row direction D2, away from the first edge E1 than the electrode lines 22 electrically connected to a column of first type touch electrode blocks 231 which is closest to the first edge E1 in the row direction D2 among the columns of first type touch electrode blocks 231 spanned by the third type touch electrode block 233, but is closer to the first edge E1 than the electrode lines 22 electrically connected to the remaining columns of first type touch electrode blocks 231 spanned by the third type touch electrode block 233.

Compared with the embodiments described above with respect to FIGS. 9-12, in the touch panel 1300, the electrode lines 22 electrically connected to the second and third type touch electrode blocks 232 and 233 have no connecting segment 22*b* outside the touch area. This facilitates the reduction of the bezel area of the touch panel 1300 and hence the realization of narrow bezel designs.

Figure 14:
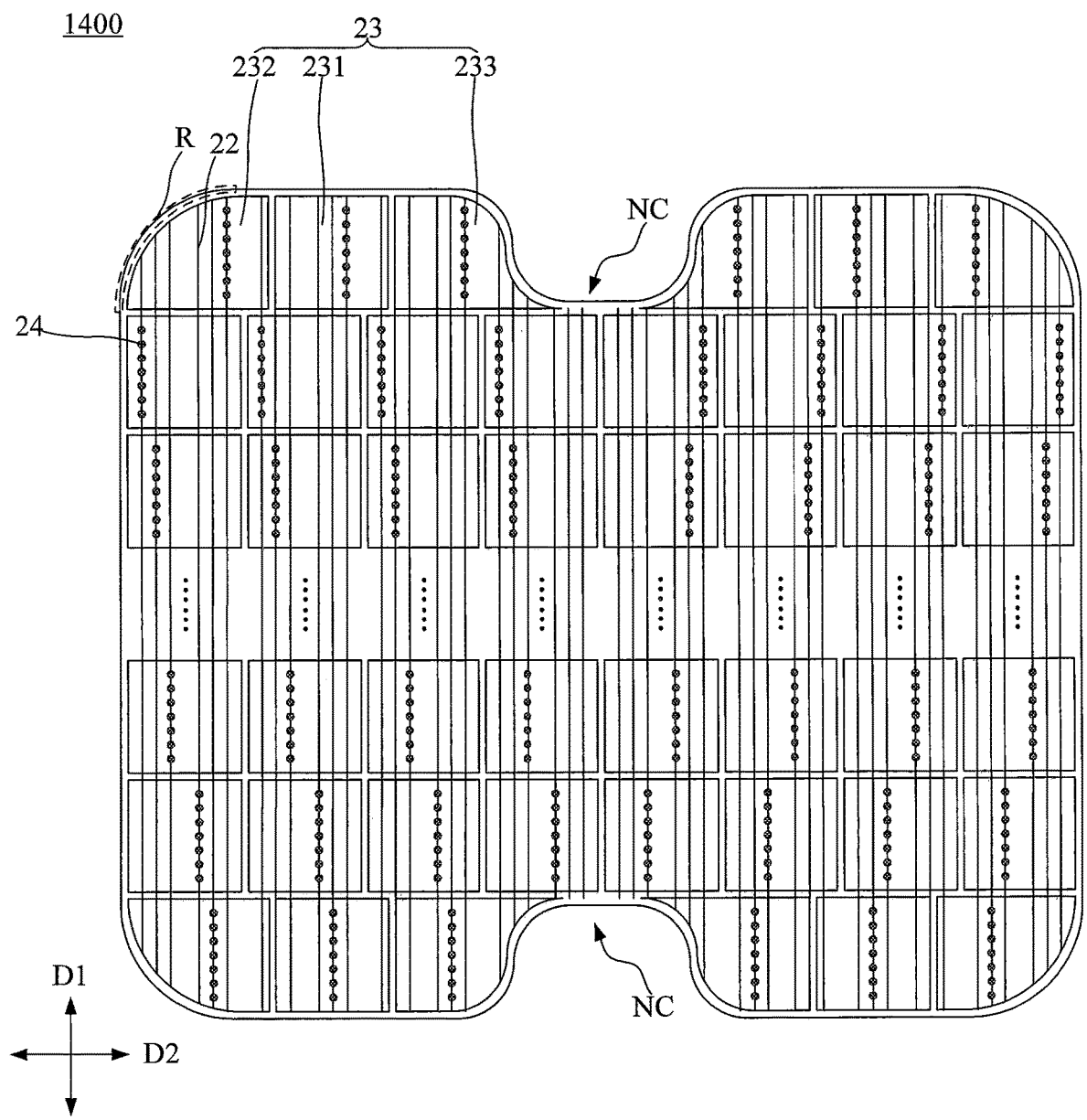
FIG. 14 is a schematic plan view of a touch panel according to an embodiment of the present disclosure.

FIG. 14 is a schematic plan view of a touch panel 1400 according to an embodiment of the present disclosure.

Referring to FIG. 14, the touch panel 1400 has substantially the same configuration as the touch panel 1300 of FIG. 13, except that the touch panel 1400 is further provided with an additional notch NC at the bottom edge. For the sake of brevity, the touch panel 1400 is not described in detail herein.

Figure 15:
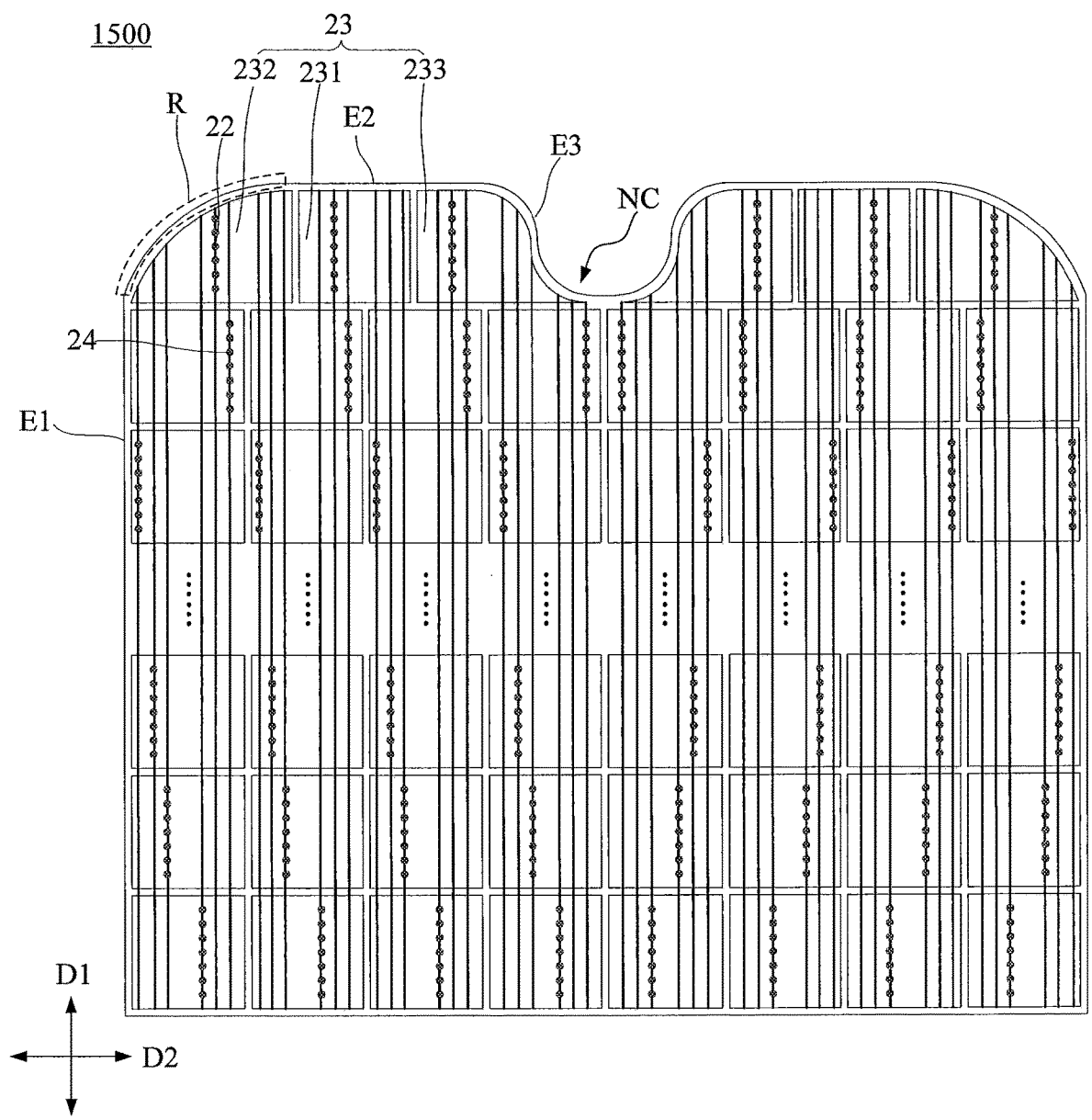
FIG. 15 is a schematic plan view of a touch panel according to an embodiment of the present disclosure.

FIG. 15 is a schematic plan view of a touch panel 1500 according to an embodiment of the present disclosure.

Referring to FIG. 15, the touch panel 1500 has the same touch electrode block arrangement as the touch panel 1000 of FIG. 10, and detailed description thereof is omitted herein for the sake of brevity.

Unlike the touch panel 1000, in the touch panel 1500, the electrode line 22 electrically connected to the second type touch electrode block 232 extends along only one straight line in the column direction D1, such that the Y contact vias 24 electrically connected to this electrode line 22 are arranged along the only one straight line in the column direction D1. The electrode line 22 electrically connected to the second type touch electrode block 232 is located between the electrode lines 22 electrically connected to a column of first type touch electrode blocks 231 which is closest to the first edge E1 in the row direction D2 among the columns of first type touch electrode blocks 231 spanned by the second type touch electrode block 232.

Still different from the touch panel 1000, in the touch panel 1500, the electrode line 22 electrically connected to the third type touch electrode block 233 extends along only one straight line in the column direction D1, such that the Y contact vias 24 electrically connected to this electrode line 22 are arranged along the only one straight line in the column direction D1. The electrode line 22 electrically connected to the third type touch electrode block 233 is located between the electrode lines 22 electrically connected to a column of first type touch electrode blocks 231 which is closest to the first edge E1 in the row direction D2 among the columns of first type touch electrode blocks 231 spanned by the third type touch electrode block 233.

Figure 16:
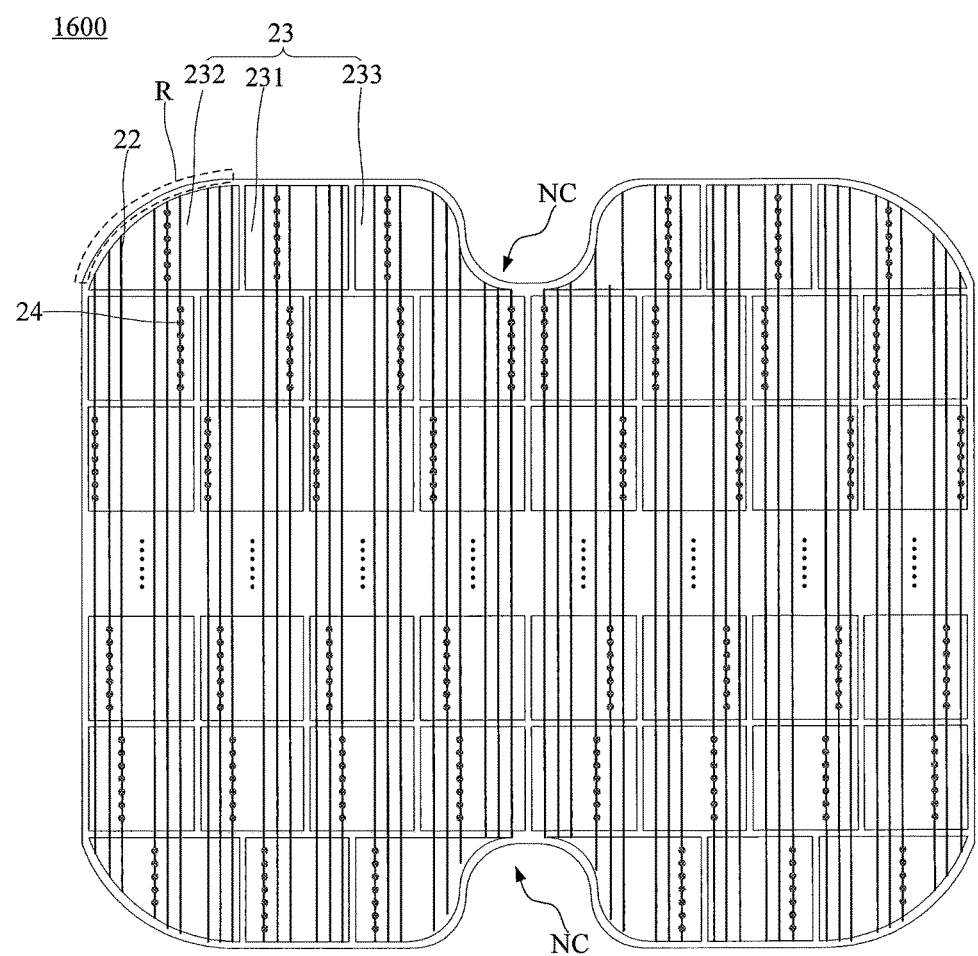
FIG. 16 is a schematic plan view of a touch panel according to an embodiment of the present disclosure.

FIG. 16 is a schematic plan view of a touch panel 1600 according to an embodiment of the present disclosure.

Referring to FIG. 16, the touch panel 1600 has substantially the same configuration as the touch panel 1500 of FIG. 15 except that the touch panel 1600 is further provided with an additional notch NC at the bottom edge, a lower left rounded corner, and a lower right rounded corner. For the sake of brevity, the touch panel 1600 is not described in detail herein.

Figure 17:
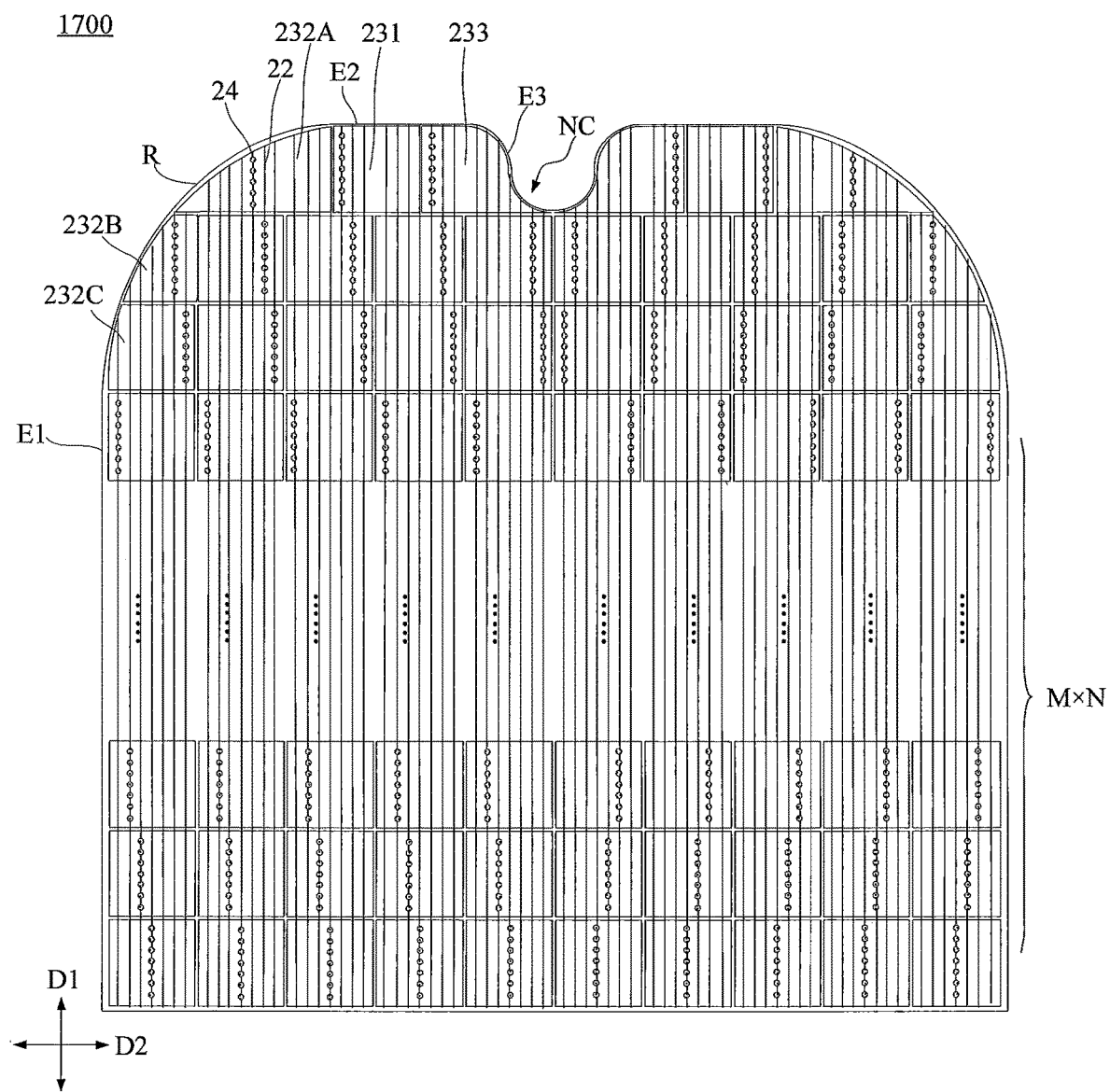
FIG. 17 is a schematic plan view of a touch panel according to an embodiment of the present disclosure.

FIG. 17 is a schematic plan view of a touch panel 1700 according to an embodiment of the present disclosure.

Referring to FIG. 17, the touch panel 1700 has a touch electrode block arrangement similar to that of the touch panel 1500 of FIG. 15, except that the touch panel 1700 now has a rounded corner R with a much larger radius. As a result, there are three second type touch electrode blocks 232A, 232B and 232C at the rounded corner R.

The second type touch electrode block 232A spans three columns of the M×N array of first type touch electrode blocks 231 in the row direction D2. The electrode line 22 electrically connected to the second type touch electrode block 232A extends along only one straight line in the column direction D1 such that the Y contact vias 24 electrically connected to this electrode line 22 are arranged along the only one straight line in the column direction D1. The electrode line 22 electrically connected to the second type touch electrode block 232A is located between respective electrode lines 22 electrically connected to the three columns of first type touch electrode blocks 231 spanned by the second type touch electrode block 232A.

The second type touch electrode block 232B is aligned with the first column of first type touch electrode blocks 231, which is closest to the first edge E1, in the M×N array of first type touch electrode blocks 231. The electrode line 22 electrically connected to the second type touch electrode block 232B extends along only one straight line in the column direction D1 such that the Y contact vias 24 electrically connected to this electrode line 22 are arranged along the only one straight line in the column direction D1. The electrode line 22 electrically connected to the second type touch electrode block 232B is farther, in the row direction D2, away from the first edge E1 than respective electrode lines 22 electrically connected to the first column of first type touch electrode blocks 231.

The second type touch electrode block 232C is also aligned with the first column of first type touch electrode blocks 231. The electrode line 22 electrically connected to the second type touch electrode block 232C extends along only one straight line in the column direction D1 such that the Y contact vias 24 electrically connected to this electrode line 22 are arranged along the only one straight line in the column direction D1. The electrode line 22 electrically connected to the second type touch electrode block 232C is farther, in the row direction D2, away from the first edge E1 than respective electrode lines 22 electrically connected to the first column of first type touch electrode blocks 231. In this example, the electrode line 22 electrically connected to the second type touch electrode block 232C is farther, in the row direction D2, away from the first edge E1 than the electrode line 22 electrically connected to the second type touch electrode block 232B.

The third type touch electrode block 233 spans two columns of the M×N array of first type touch electrode blocks 231 in the row direction D2. The electrode line 22 electrically connected to the third type touch electrode block 233 extends along only one straight line in the column direction D1 such that the Y contact vias 24 electrically connected to this electrode line 22 are arranged along the only one straight line in the column direction D1. The electrode line 22 electrically connected to the third type touch electrode block 233 is located between respective electrode lines 22 electrically connected to the two columns of first type touch electrode blocks 231 spanned by the third type touch electrode block 233. Specifically, the electrode line 22 electrically connected to the third type touch electrode block 233 is farther away from the first edge E1 than the electrode lines 22 electrically connected to a column of first type touch electrode blocks 231 which is closest to the first edge E1 in the row direction D2 among the columns of first type touch electrode blocks 231 spanned by the third type touch electrode block 233, but is closer to the first edge E1 than the electrode lines 22 electrically connected to the other column of first type touch electrode blocks 231 spanned by the third type touch electrode block 233.

Figure 18:
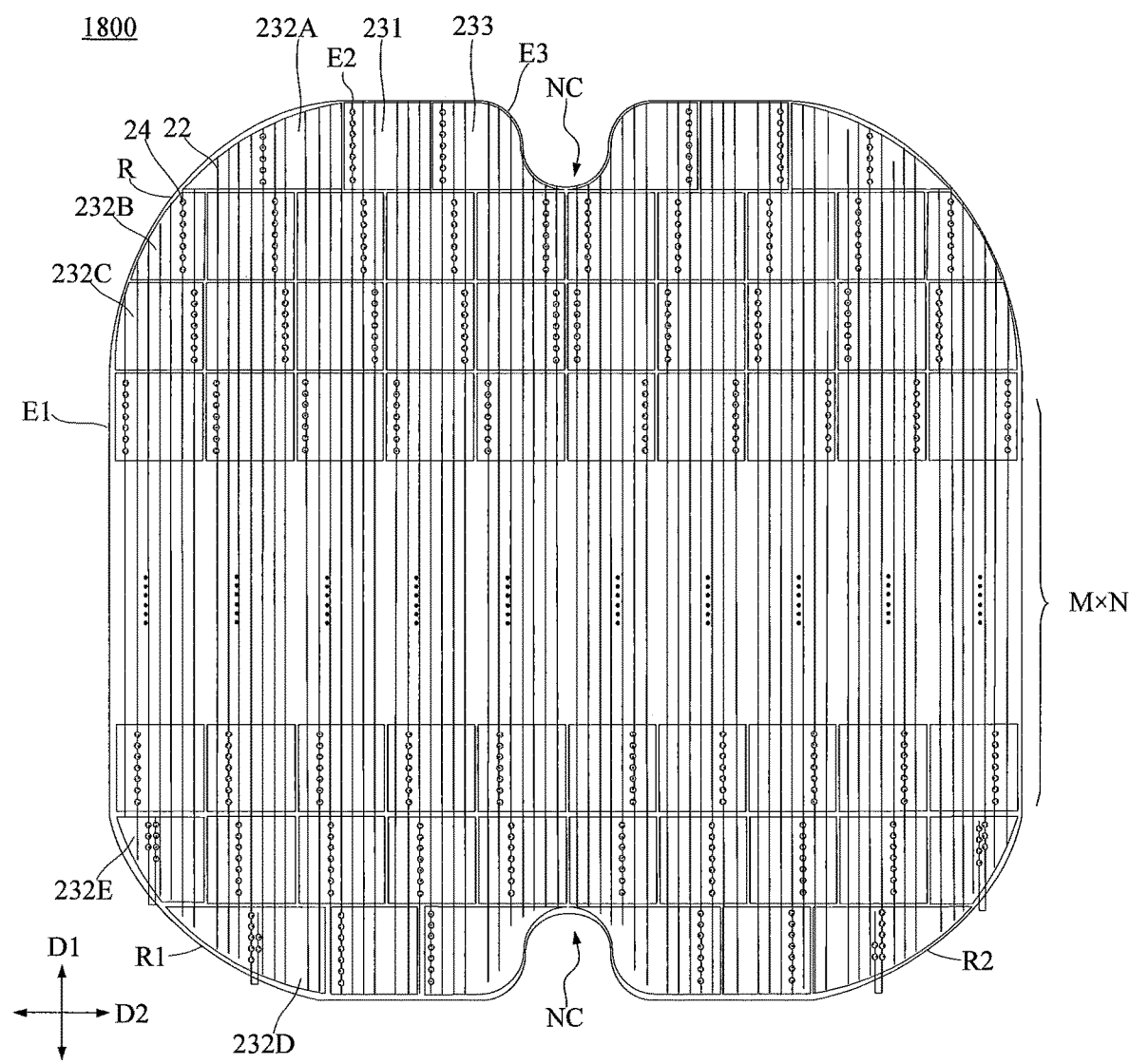
FIG. 18 is a schematic plan view of a touch panel according to an embodiment of the present disclosure.

FIG. 18 is a schematic plan view of a touch panel 1800 according to an embodiment of the present disclosure.

Referring to FIG. 18, the touch panel 1800 has substantially the same configuration as the touch panel 1700 of FIG. 17 except that the touch panel 1800 is further provided with an additional notch NC at the bottom edge, a lower left rounded corner R1, and a lower right rounded corner R2. The same configuration of the touch panel 1800 as that of the touch panel 1700 is omitted here for the sake of brevity.

At the lower left rounded corner R1, there are two second type touch electrode blocks 232D and 232E. The second type touch electrode blocks 232D and 232E each have an arrangement of electrode line-contact vias similar to that of the second type touch electrode block 232 shown in FIG. 9, the detailed description of which is omitted here for the sake of brevity.

The touch panel embodiments described above may have an arrangement of touch electrode blocks, electrode lines, and contact vias that is symmetric about a center line extending in the column direction D1, although this is not necessary. In this case, only a half area of the illustrated touch panel is described, and the description of the other half area of the illustrated touch panel is omitted for the sake of brevity.

Figure 19:
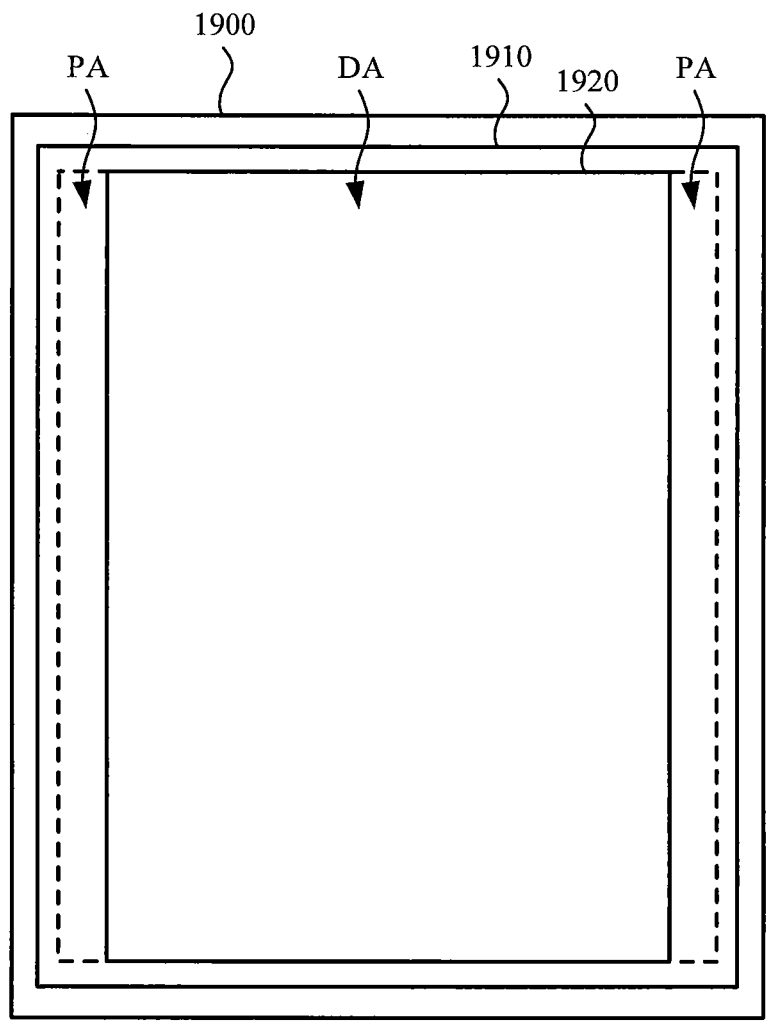
FIG. 19 is a schematic block diagram of a touch display device according to an embodiment of the present disclosure.

FIG. 19 is a schematic block diagram of a touch display device 1900 according to an embodiment of the present disclosure.

Referring to FIG. 19, the display device 1900 includes a display panel 1910 that displays images and a touch panel 1920 that is integrated with the display panel 1910. The display panel 1910 may be an organic light emitting display panel. However, this is not restrictive, and the display panel 1910 may be any other type of display panel.

The display panel 1910 may include a display area DA and a peripheral area PA disposed outside the display area DA. The display area DA may include a plurality of pixels, and an image may be displayed from the display area DA. The peripheral area PA may be disposed on one side of the display area DA. As shown in FIG. 19, the peripheral area PA surrounds at least a portion of the display area DA, but this is not restrictive. The arrangement of the display area DA and the peripheral area PA may be changed as needed.

The touch panel 1920 may take the form of any of the touch panels and variations thereof described above with respect to FIGS. 2-18. In the present exemplary embodiment, the touch panel 1920 is disposed in the display area DA, but this is not restrictive. The touch panel 1920 may extend to the peripheral area PA.

It will be understood that although the display device 1900 is illustrated in FIG. 19 as having a rectangular outline, this is merely illustrative. For purposes of the present disclosure, the display device 1900 in fact has a substantially rectangular outline with at least one rounded corner.

While several specific implementation details are contained in the above discussions, these should not be construed as limitations on the scope of the present disclosure, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The above description is only specific embodiments of the present disclosure, and the scope of the present disclosure is not limited thereto. Variations or substitutions of the disclosed embodiments can be readily conceived of by those skilled in the art without departing from the scope of the disclosure. Thus, the scope of the disclosure should be defined by the appended claims.

What is claimed is:

1. A touch panel, comprising:
a substrate;
an insulating layer on the substrate;
a plurality of touch electrode blocks on a first side of the insulating layer, the plurality of touch electrode blocks comprising multiple first type touch electrode blocks having a regular shape and a second type touch electrode block having an irregular shape; and
a plurality of electrode lines on a second side of the insulating layer, the second side being opposite to the first side in a thickness direction of the insulating layer,
wherein the plurality of touch electrode blocks are on a touch area of the touch panel, and the touch area comprises a rectangular shape with a rounded corner,
wherein the multiple first type touch electrode blocks comprise a M*N array of first type touch electrode blocks, M and N are integers, and M≥2, N≥2, the second type touch electrode block is at the rounded corner, and the irregular shape is adapted to the rounded corner such that a portion of an outline of the second type touch electrode block is conformal to at least a portion of an outline of the rounded corner,
wherein the plurality of electrode lines extend in a column direction of the M*N array and spaced apart from each other,
wherein ones of the first type touch electrode blocks are electrically connected to respective ones of the plurality of electrode lines by respective X first contact vias extending through the insulating layer, and the respective X first contact vias are arranged in a straight line in the column direction,
wherein the second type touch electrode block is electrically connected to a first corresponding one of the plurality of electrode lines by Y second contact vias extending through the insulating layer, and the Y second contact vias are arranged along at least one straight line in the column direction, and
wherein X and Y are natural numbers, and 0.75× X≤Y≤1.25×X,
wherein the touch area comprises a first edge extending in the column direction and a second edge extending in a row direction of the array, the first edge and the second edge adjoin the rounded corner, wherein the touch area further comprises a third edge adjoining the second edge and defining a notch of the touch area,
wherein the plurality of touch electrode blocks further comprise a third type touch electrode block having an irregular shape adapted to the notch such that a portion of an outline of the third type touch electrode block is conformal to a portion of an outline of the notch,
wherein the multiple first type touch electrode blocks further comprise an additional first type touch electrode block between the second type touch electrode block and the third type touch electrode block, wherein the second type touch electrode block, the additional first type touch electrode block and the third type touch electrode block are arranged along the row direction of the array, wherein each of the second type touch electrode block, the additional first type touch electrode block and the third type touch electrode block is shifted with respect to each column of first type touch electrode blocks of the array of first type touch electrode blocks in the column direction of the array, wherein the first type touch electrode block, the second type touch electrode block and the third type touch electrode block have a substantially same area.

2. The touch panel of claim 1,
wherein a side of the second type touch electrode block close to the first edge is aligned with a first column of first type touch electrode blocks of the array of first type touch electrode blocks.

3. The touch panel of claim 2,
wherein the first corresponding one of the plurality of electrode lines comprises a body segment extending in the column direction, at least one extending segment spaced apart from and parallel to the body segment, and a connecting segment connecting the body segment and the at least one extending segment,
wherein the body segment is closer, in the row direction, to the first edge than respective ones of the plurality of electrode lines that are electrically connected to the first column of first type touch electrode blocks,
wherein the at least one extending segment is between the respective ones of the plurality of electrode lines, and
wherein at least a portion of the Y second contact vias are arranged along the at least one extending segment.

4. The touch panel of claim 3, wherein the connecting segment is at least partially outside the touch area.

5. The touch panel of claim 2,
wherein the third type touch electrode block is on a same side as the second type touch electrode block with respect to the notch, and
wherein the third type touch electrode block is electrically connected to a second corresponding one of the plurality of electrode lines by Y third contact vias extending through the insulating layer, and the Y third contact vias are arranged in a straight line in the column direction.

6. The touch panel of claim 5,
wherein the third type touch electrode block spans at least two columns of the first type touch electrode blocks in the row direction.

7. The touch panel of claim 6, wherein the second corresponding one of the plurality of electrode lines is closer to the first edge than respective ones of the plurality of electrode lines that are electrically connected to the at least two columns of first type touch electrode blocks.

8. The touch panel of claim 1,
wherein the second type touch electrode block spans at least two columns of first type touch electrode blocks in the row direction of the array.

9. The touch panel of claim 8,
wherein the first corresponding one of the plurality of electrode lines comprises a body segment extending in the column direction, at least one extending segment spaced apart from and parallel to the body segment, and a connecting segment connecting the body segment and the at least one extending segment,
wherein the body segment is closer, in the row direction, to the first edge than respective ones of the plurality of electrode lines that are electrically connected to the at least two columns of first type touch electrode blocks,
wherein the at least one extending segment is between the respective ones of the plurality of electrode lines, and
wherein at least a portion of the Y second contact vias are arranged along the at least one extending segment.

10. The touch panel of claim 9, wherein the connecting segment is at least partially outside the touch area.

11. The touch panel of claim 8,
wherein the first corresponding one of the plurality of electrode lines extends along one straight line in the column direction, such that the Y second contact vias are arranged along the one straight line in the column direction, and
wherein the first corresponding one of the plurality of electrode lines is between respective ones of the plurality of electrode lines that are electrically connected to the at least two columns of first type touch electrode blocks.

12. The touch panel of claim 8,
wherein the third type touch electrode block is on a same side as the second type touch electrode block with respect to the notch, and
wherein the third type touch electrode block is electrically connected to a second corresponding one of the plurality of electrode lines by Y third contact vias extending through the insulating layer, and the Y third contact vias are arranged along a straight line in the column direction.

13. The touch panel of claim 12,
wherein the third type touch electrode block spans at least two columns of first type touch electrode blocks in the row direction.

14. The touch panel of claim 13,
wherein the second corresponding one of the plurality of electrode lines comprises a body segment extending in the column direction, at least one extending segment spaced apart from and parallel to the body segment, and a connecting segment connecting the body segment and the at least one extending segment,
wherein the body segment is closer, in the row direction, to the first edge than respective ones of the plurality of electrode lines that are electrically connected to the at least two columns of first type touch electrode blocks,
wherein the at least one extending segment is between the respective ones of the plurality of electrode lines, and
wherein at least a portion of the Y second contact vias are arranged along the at least one extending segment.

15. The touch panel of claim 14, wherein the connecting segment is at least partially outside the touch area.

16. The touch panel of claim 13,
wherein the second corresponding one of the plurality of electrode lines extends along one straight line in the column direction, such that the Y third contact vias are arranged along the one straight line in the column direction, and
wherein the second corresponding one of the plurality of electrode lines is between respective ones of the plurality of electrode lines that are electrically connected to the at least two columns of first type touch electrode blocks.

17. A touch display device, comprising:
a touch panel comprising:
a substrate;
an insulating layer on the substrate;
a plurality of touch electrode blocks on a first side of the insulating layer, the plurality of touch electrode blocks comprising multiple first type touch electrode blocks having a regular shape and a second type touch electrode block having an irregular shape; and
a plurality of electrode lines on a second side of the insulating layer, the second side being opposite to the first side in a thickness direction of the insulating layer,
wherein the plurality of touch electrode blocks are on a touch area of the touch panel, and the touch area comprises a rectangular shape with a rounded corner,
wherein the multiple first type touch electrode blocks comprise a M*N array of first type touch electrode blocks, M and N are integers, and M≥2, N≥2, the second type touch electrode block is at the rounded corner, and the irregular shape is adapted to the rounded corner such that a portion of an outline of the second type touch electrode block is conformal to at least a portion of an outline of the rounded corner, wherein the plurality of electrode lines extend in a column direction of the array and spaced apart from each other, wherein ones of the first type touch electrode blocks are electrically connected to respective ones of the plurality of electrode lines by respective X first contact vias extending through the insulating layer, and the respective X first contact vias are arranged in a straight line in the column direction, wherein the second type touch electrode block is electrically connected to a first corresponding one of the plurality of electrode lines by Y second contact vias extending through the insulating layer, and the Y second contact vias are arranged along at least one straight line in the column direction, and wherein X and Y are natural numbers, and $0.75 \times X \leq Y \leq 1.25 \times X$, wherein the touch area comprises a first edge extending in the column direction and a second edge extending in a row direction of the array, the first edge and the second edge adjoin the rounded corner, wherein the touch area further comprises a third edge adjoining the second edge and defining a notch of the touch area, wherein the plurality of touch electrode blocks further comprise a third type touch electrode block having an irregular shape adapted to the notch such that a portion of an outline of the third type touch electrode block is conformal to a portion of an outline of the notch, wherein the multiple first type touch electrode blocks further comprise an additional first type touch electrode block between the second type touch electrode block and the third type touch electrode block, wherein the second type touch electrode block, the additional first type touch electrode block and the third type touch electrode block are arranged along the row direction of the array, wherein each of the second type touch electrode block, the additional first type touch electrode block and the third type touch electrode block is shifted with respect to each column of first type touch electrode blocks of the array of first type touch electrode blocks in the column direction of the array, wherein the first type touch electrode block, the second type touch electrode block and the third type touch electrode block have a substantially same area.

* * * * *